United States Patent
Ryu et al.

(10) Patent No.: US 11,096,074 B2
(45) Date of Patent: Aug. 17, 2021

(54) METHOD AND APPARATUS FOR UPLINK TRANSMISSION IN WIRELESS COMMUNICATION SYSTEM

(71) Applicant: Samsung Electronics Co., Ltd., Suwon-si (KR)

(72) Inventors: Hyunseok Ryu, Yongin-si (KR); Yongseok Kim, Incheon (KR); Peng Xue, Suwon-si (KR); Hyunkyu Yu, Suwon-si (KR); Sangwon Choi, Seoul (KR); Kuyeon Whang, Gwangmyeong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/878,065

(22) Filed: May 19, 2020

(65) Prior Publication Data
US 2020/0280868 A1 Sep. 3, 2020

Related U.S. Application Data

(63) Continuation of application No. 16/054,504, filed on Aug. 3, 2018, now Pat. No. 10,694,409.

(30) Foreign Application Priority Data

Aug. 10, 2017 (KR) .................. 10-2017-0101478

(51) Int. Cl.
*H04W 24/08* (2009.01)
*H04L 5/00* (2006.01)
(Continued)

(52) U.S. Cl.
CPC .......... *H04W 24/08* (2013.01); *H04L 5/0048* (2013.01); *H04L 5/0053* (2013.01);
(Continued)

(58) Field of Classification Search
CPC . H04W 24/08; H04W 74/0833; H04W 76/27; H04L 5/0053; H04L 5/0094
See application file for complete search history.

(56) References Cited

U.S. PATENT DOCUMENTS 10,694,409 B2 * 6/2020 Ryu .................. H04W 76/27
2009/0042582 A1 2/2009 Wang et al.
(Continued)

FOREIGN PATENT DOCUMENTS

EP 2544390 A1 1/2013
EP 2733873 A2 5/2014
(Continued)

OTHER PUBLICATIONS

International Search Report dated Oct. 30, 2018, issued in International Application No. PCT/KR2018/008692.
(Continued)

*Primary Examiner* — Mohammad S Anwar
(74) *Attorney, Agent, or Firm* — Jefferson IP Law, LLP

(57) ABSTRACT

A communication method and system for converging a $5^{th}$-Generation (5G) communication system for supporting higher data rates beyond a $4^{th}$-Generation (4G) system with a technology for Internet of Things (IoT) are provided, which may be applied to intelligent services based on the 5G communication technology and the IoT-related technology, such as smart home, smart building, smart city, smart car, connected car, health care, digital education, smart retail, security and safety services. An uplink transmission method is provided, which can increase an uplink coverage through improvement of reception reliability of uplink control information and data information.

20 Claims, 18 Drawing Sheets

(51) Int. Cl.

| | | |
|---|---|---|
| *H04W 74/08* | (2009.01) | |
| *H04W 76/27* | (2018.01) | |
| *H04W 72/04* | (2009.01) | |
| *H04W 74/04* | (2009.01) | |
| *H04W 74/00* | (2009.01) | |
| *H04L 5/14* | (2006.01) | |

(52) U.S. Cl.
CPC ....... *H04L 5/0094* (2013.01); *H04W 72/0413* (2013.01); *H04W 74/04* (2013.01); *H04W 74/0833* (2013.01); *H04W 76/27* (2018.02); *H04L 5/001* (2013.01); *H04L 5/0023* (2013.01); *H04L 5/0035* (2013.01); *H04L 5/0064* (2013.01); *H04L 5/14* (2013.01); *H04W 74/008* (2013.01)

(56) References Cited

U.S. PATENT DOCUMENTS

| | | |
|---|---|---|
| 2010/0113051 A1 | 5/2010 | Du et al. |
| 2011/0039499 A1 | 2/2011 | Zhang et al. |
| 2012/0076042 A1 | 3/2012 | Chun et al. |
| 2012/0320833 A1 | 12/2012 | Yamamoto et al. |
| 2013/0258895 A1 | 10/2013 | Kim et al. |
| 2015/0016377 A1 | 1/2015 | Kim et al. |
| 2015/0305066 A1 | 10/2015 | Jeong et al. |
| 2015/0365978 A1 | 12/2015 | Kim et al. |
| 2016/0157238 A1* | 6/2016 | Lee .......................... H04L 5/001 370/329 |
| 2016/0255591 A1 | 9/2016 | Park et al. |
| 2017/0181196 A1 | 6/2017 | Chun et al. |
| 2017/0195978 A1 | 7/2017 | Lindholm et al. |
| 2018/0139759 A1 | 5/2018 | Park et al. |
| 2019/0021058 A1 | 1/2019 | Cheng et al. |

FOREIGN PATENT DOCUMENTS

| | | |
|---|---|---|
| KR | 10-2015-0113073 A | 10/2015 |
| KR | 10-2016-0134274 A | 11/2016 |
| KR | 10-1875252 B1 | 7/2018 |
| KR | 10-2217075 B1 | 2/2021 |
| WO | 2011/017281 A1 | 2/2011 |

OTHER PUBLICATIONS

Extended European Search Report dated Jul. 3, 2020, issued in European Application No. 18844296.6-1205.

Huawei et al.: "On DL multiplexing of URLLC and eMBB transmissions", 3GPP Draft; R1-1704216, 3rd Generation Partnership Project (3GPP), Mobile Competence Centre; 650, Route Des Lucioles; vol. RAN WG1, No. Spokane, USA; Apr. 3, 2017-Apr. 7, 2017, Mar. 25, 2017, XP051251025, Mar. 25, 2017.

Korean Notification of a Decision to Grant a Patent dated Jun. 17, 2021, issued in Korean Application No. 10-2017-0101478.

Extended European Search Report dated Jun. 24, 2021, issued in European Application No. 21166061.8-1205.

* cited by examiner

METHOD AND APPARATUS FOR UPLINK TRANSMISSION IN WIRELESS COMMUNICATION SYSTEM

CROSS-REFERENCE TO RELATED APPLICATION(S)

This application is a continuation of prior application Ser. No. 16/054,504, filed on Aug. 3, 2018, which is based on and claims priority under 35 U.S.C. § 119(a) of a Korean patent application number 10-2017-0101478, filed on Aug. 10, 2017, in the Korean Intellectual Property Office, the disclosure of which is incorporated by reference herein in its entirety.

BACKGROUND

1. Field

The disclosure relates to a communication system. More particularly, the disclosure relates to a method and an apparatus by a terminal for uplink transmission in a communication system.

2. Description of the Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency millimeter wave (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

On the other hand, in order to solve the cell radius reduction problem due to reduction of the radio-wave propagation distance as described above, discussions on supplementary uplink (SUL) operations are in progress. A 5G system (hereinafter referred to as "new radio (NR) system") has a separate downlink/uplink band (in case of a frequency division duplex (FDD) system) operating the NR or a time division duplex (TDD) band operating the NR, and can share an uplink with the 4G system in the related art. Accordingly, from the viewpoint of the NR system, the uplink that is shared with the 4G system may be considered as an additional uplink, and such an additional uplink is called a SUL. Since the SUL operates at a center frequency that is lower than that of the NR band, it is possible to extend an uplink coverage of the NR system.

Since such a scenario does not exist in the 4G system in the related art, any operation method of a terminal and a base station in such a scenario has not been defined, and thus it is necessary to define such an operation method.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for operations of a terminal and a base station for uplink transmission in a wireless communication system.

Additional aspects will be set forth in part in the description which follows and, in part, will be apparent from the description, or may be learned by practice of the presented embodiments.

In accordance with an aspect of the disclosure, a method by a terminal for performing a random access is provided. The method includes receiving information for performing the random access from a base station, determining a frequency band to perform the random access between first and second frequency bands based on the information for performing the random access, and transmitting a preamble through the determined frequency band.

Determining the frequency band may include measuring a reference signal received power (RSRP) received from the base station, comparing the RSRP with a threshold value included in the information for performing the random access, determining the first frequency band as the frequency band for performing the random access if the RSRP is smaller than the threshold value, and determining the second frequency band as the frequency band for performing the random access if the RSRP is equal to or larger than the threshold value.

Transmitting the preamble may include identifying a target received power parameter of the preamble corresponding to the first frequency band from the information for performing the random access if the RSRP is smaller than the threshold value, and transmitting the preamble through the first frequency band based on the target received power parameter of the preamble corresponding to the first frequency band.

Transmitting the preamble may include identifying a target received power parameter of the preamble corresponding to the second frequency band from the information for performing the random access if the RSRP is equal to or larger than the threshold value, and transmitting the preamble through the second frequency band based on the target received power parameter of the preamble corresponding to the second frequency band.

The first frequency band may be lower than the second frequency band.

The method may further include receiving information on transmission of a physical uplink control channel (PUCCH) from the base station through terminal-specific radio resource control (RRC) signaling, and transmitting the PUCCH through the first or second frequency band based on the information on the transmission of the PUCCH.

In accordance with another aspect of the disclosure, a method by a base station for performing a random access is provided. The method includes generating information for performing the random access in a first or second frequency band, transmitting the generated information to a terminal, and receiving a preamble for performing the random access through the determined frequency band based on the generated information.

The method may further include transmitting to the terminal information on a frequency band related to transmission of a physical uplink control channel (PUCCH) through terminal-specific radio resource control (RRC) signaling.

In accordance with another aspect of the disclosure, a terminal is provided. The terminal includes a transceiver, and a controller configured to control the transceiver to receive information for performing a random access from a base station, determine a frequency band to perform the random access between first and second frequency bands based on the information for performing the random access, and control the transceiver to transmit a preamble through the determined frequency band.

The controller may be configured to measure a reference signal received power (RSRP) received from the base station, compare the RSRP with a threshold value included in the information for performing the random access, determine the first frequency band as the frequency band for performing the random access if the RSRP is smaller than the threshold value, and determine the second frequency band as the frequency band for performing the random access if the RSRP is equal to or larger than the threshold value.

The controller may be configured to identify a target received power parameter of the preamble corresponding to the first frequency band from the information for performing the random access if the RSRP is smaller than the threshold value, and control the transceiver to transmit the preamble through the first frequency band based on the target received power parameter of the preamble corresponding to the first frequency band.

The controller may be configured to identify a target received power parameter of the preamble corresponding to the second frequency band from the information for performing the random access if the RSRP is equal to or larger than the threshold value, and control the transceiver to transmit the preamble through the second frequency band based on the target received power parameter of the preamble corresponding to the second frequency band.

The controller may be configured to control the transceiver to receive information on transmission of a physical uplink control channel (PUCCH) from the base station through terminal-specific radio resource control (RRC) signaling, and control the transceiver to transmit the PUCCH through the first or second frequency band based on the information on the transmission of the PUCCH.

In accordance with another aspect of the disclosure, a base station is provided. The base station includes a transceiver, and a controller configured to generate information for performing the random access in a first or second frequency band, control the transceiver to transmit the generated information to a terminal, and control the transceiver to receive a preamble for performing the random access through the frequency band determined based on the generated information.

The controller may be configured to control the transceiver to transmit to the terminal information on a frequency band related to transmission of a physical uplink control channel (PUCCH) through terminal-specific radio resource control (RRC) signaling.

According to the aspects of the disclosure, the method for uplink transmission can improve reception reliability of uplink control information and data information, and thus can increase the uplink coverage.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
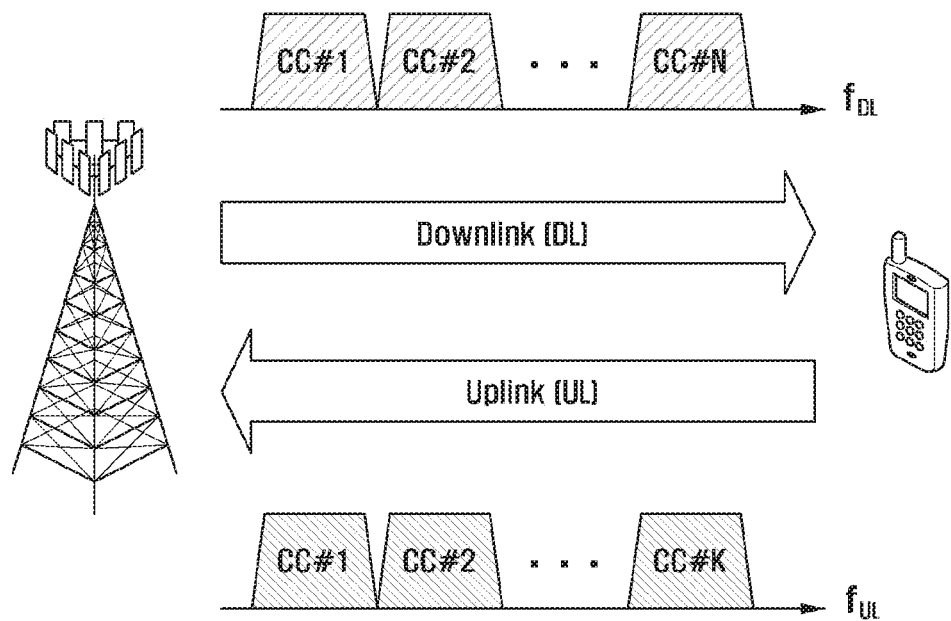
FIG. 1 is a diagram explaining an example of carrier aggregation (CA) in a frequency division duplex (FDD) system of a long term evolution advanced (LTE-A) in the according to the related art.

FIG. 1 is a diagram explaining an example of carrier aggregation (CA) in a frequency division duplex (FDD) system of an LTE-A in the related art.

Referring to FIG. 1, it is exemplified that a downlink is composed of N component carriers (CCs), and an uplink is composed of K CCs. Such a CA technology can support a large bandwidth through aggregation of two or more carriers having small-sized bandwidths, and thus it can heighten the data rate and can efficiently use frequency spectrums. For example, the maximum bandwidth of 100 MHz can be supported through aggregation of five CCs each having the maximum bandwidth of 20 MHz.

On the other hand, CA introduced in LTE Rel-10 (Release-10) has a limitation that it should support a terminal 120 of an LTE version in the related art (e.g., a Rel-8/Rel-9 terminal). For this, in LTE Rel-10 CA, a physical broadcast channel (PBCH) including a synchronization signal, such as a primary synchronization signal (PSS) and a secondary synchronization signal (SSS), and system information is transmitted from all CCs. That is, since the Rel-8/9 terminal does not have the CA function, downlink synchronization is preformed using one downlink CC among PSS/SSS and PBCHs transmitted from all CCs, such as CC #1 to CC # N, and the random access is performed through the uplink CC corresponding to the downlink CC having performed the downlink synchronization, so that the terminal can access the corresponding cell. That is, from the viewpoint of a Rel-8/9 terminal, CC #1 to CC # N may be seen as different Cell #1 to Cell # N. In the same manner, in order to support compatibility (backward compatibility) with a previous release terminal, a terminal supporting Rel-10 CA functions can also access the cell through a specific CC through reception of PSS/SSS and PBCH transmitted through all CCs, such as CC #1 to CC # N. The terminal supporting Rel-10 CA functions accessing through one CC consider the corresponding CC as the primary CC (PCC), and the remaining CCs excluding the PCC may be candidates of the secondary CC (SCC). A base station can configure how many CCs among the SCC candidates will be actual SCCs of a specific terminal. Further, the terminal having accessed the cell through the PCC can perform change of the PCC accessed through a handover process.

Although FIG. 1 illustrates the FDD system, the CA can also be applied to a TDD system in the same manner. However, in the TDD system, as illustrated in FIG. 1, the downlink frequency band and the uplink frequency band are not discriminated from each other. That is, if it is assumed that the TDD frequency band is composed of N CCs, downlink subframes and uplink subframes in the respective CCs may exist in accordance with TDD DL/UL configurations. Further, although not illustrated in FIG. 1, the CCs defined for the FDD system and the CCs defined for the TDD system can perform the CA.

Figure 2A:
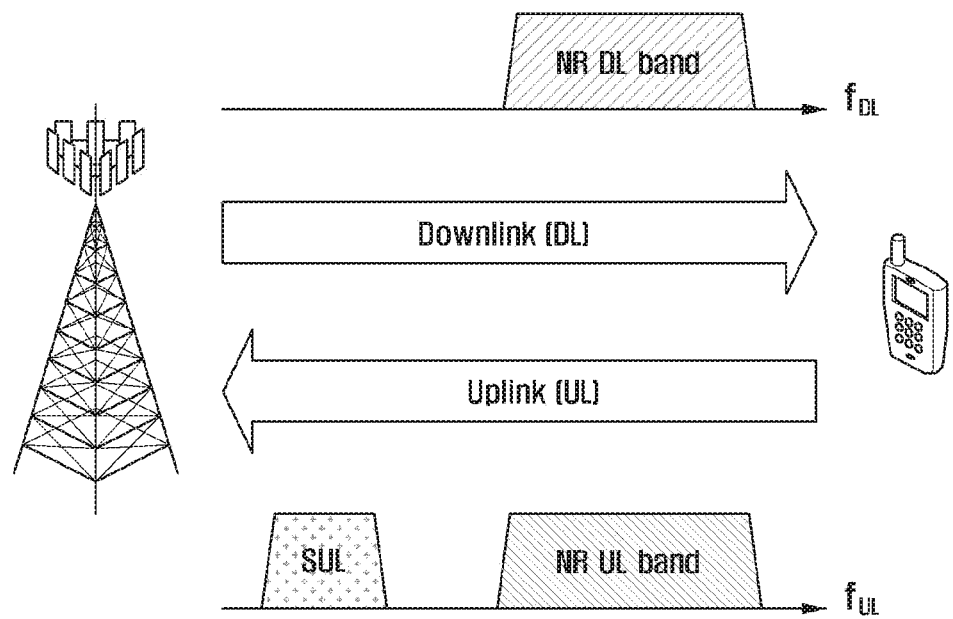
FIG. 2A is a diagram explaining an example of a supplementary uplink (SUL) operation scenario in a new radio (NR) FDD system according to various embodiments of the disclosure.

FIG. 2A is a diagram explaining an example of a SUL scenario in an NR FDD system according to various embodiments of the disclosure.

A system having an NR DL band and an NR UL band may operate a SUL at a center frequency that is lower than that of the NR band. In this case, the system disclosed in FIG. 2A is different from the system disclosed in FIG. 1 on the point that there is no downlink band corresponding to the SUL. Accordingly, the terminal may perform downlink synchronization and may acquire system information using PSS/SSS and PBCH transmitted on the NR DL band. The uplink synchronization (i.e., random access) may be performed using the NR UL band or the SUL.

Figure 2B:
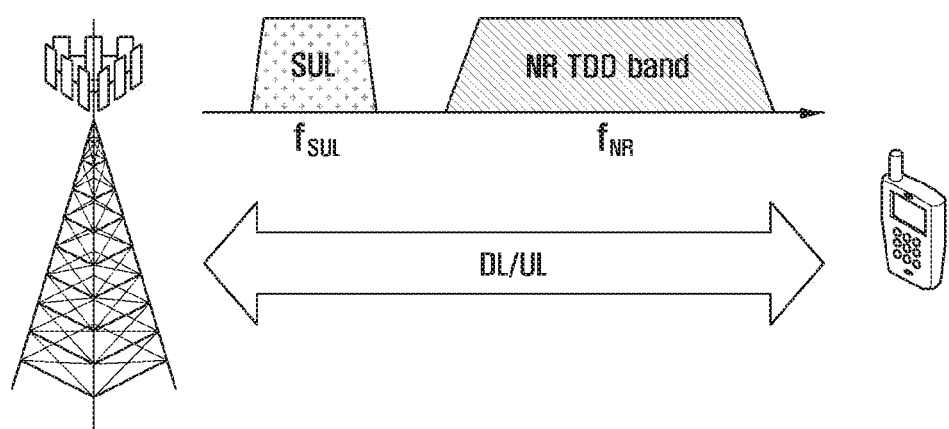
FIG. 2B is a diagram explaining an example of a SUL operation scenario in an NR TDD system according to various embodiments of the disclosure.

FIG. 2B is a diagram explaining an example of a SUL operation scenario in an NR TDD system according to various embodiments of the disclosure.

The 5G TDD system may perform downlink and uplink transmission/reception on an NR TDD band. In addition, the 5G TDD system may perform uplink transmission on a separate SUL frequency band $f_{SUL}$. In the system disclosed in FIG. 2B, in the same manner as the system disclosed in FIG. 2A, the terminal may perform downlink synchronization and may acquire system information using PSS/SSS and PBCH transmitted on the NR TDD band. The uplink synchronization (i.e., random access) may be performed using uplink subframes of the NR TDD band or a separate SUL frequency band. That is, the SUL frequency band $f_{SUL}$ is used only for uplink transmission of the terminal and uplink reception of the base station, but is not used for downlink reception of the terminal and downlink transmission of the base station.

Although not illustrated in FIG. 2A, each of the NR DL band and the NR UL band may be composed of two or more CCs as illustrated in FIG. 1. Further, although not illustrated in FIG. 2B, the NR TDD band may be composed of two or more CCs as illustrated in FIG. 1. In FIG. 1, a pair is formed between the CC on which the terminal performs downlink synchronization and the CC on which the terminal performs uplink synchronization, whereas in FIGS. 2A and 2B, there is no DL band or DL subframe corresponding to the SUL, and thus the DL band or the DL subframe that forms a pair with the SUL does not exist. Accordingly, it may be necessary to define operations of the base station and the terminal on whether the terminal performs the uplink synchronization through the NR UL band (or NR UL subframe) or the SUL band (or SUL subframe). The disclosure proposes the operations of the base station and the terminal to operate the SUL.

The DL band may be the term used in the FDD system, and the DL subframe may be the term used in the TDD system or FDD system. However, in the disclosure, it is predefined that the NR DL band may call one of the NR DL band and the NR DL subframe.

Option 1) The base station transmits a random access parameter for one band between the NR UL band and the SUL band.

The base station may transmit a random access parameter for one band between the NR UL band and the SUL band, and the terminal may perform a random access for one band between the NR UL band and the SUL band using the random access parameter transmitted by the base station. Accordingly, the base station may expect to receive the random access preamble from the band configured by the base station itself, and may monitor only the random access preamble on the corresponding band.

As an example, the base station may transmit the random access parameter for the NR UL band or the SUL band to the terminal through system information (e.g., remaining minimum system information (RMSI)) or other system information (OSI). In this case, the random access parameter may include the following examples, and the following parameters are commonly existing parameters regardless of whether the base station transmits the random access parameter for the NR UL band or the random access parameter for the SUL band. However, since the NR UL band and the SUL band may have quite different channel characteristics, the respective parameters may have different values depending on whether the base station transmits the random access parameter for the NR UL band or the random access parameter for the SUL band.

Random Access Parameter

This is time resource information for transmitting the random access preamble, and may include a system frame number for transmitting the random access preamble, subframe number (or slot number), random access preamble format, density of the random access preamble (in case of a TDD system), and parameter for notifying of a version index of the random access preamble (prach-ConfigurationIndex).

Information indicating the location of a frequency resource for transmitting the random access preamble as the number of resource blocks (RBs) at the center frequency at which the random access preamble is transmitted (prach-FrequencyOffset).

Sequence information on the random access preamble, and information notifying of a logical root sequence number of a root Zadoff-Chu sequence used for the random access preamble (rootSequenceIndex).

Maximum number of transmissions of the random access preamble (preambleTransMax).

Window size for receiving a random access response (RAR) (ra-ResponseWindowSize).

Transmitted power increment size of the random access preamble (powerRampingStep).

Initial random access preamble transmitted power (preambleInitialReceivedTargetPower).

Subcarrier spacing that can be used to transmit the random access preamble (subcarrier spacing).

Uplink waveform information used for Msg.3 transmission (i.e., information notifying whether the information is DFT-S-OFDM or CP-OFDM).

In order to indicate a band on which the terminal can perform the random access in addition to the random access parameter, the base station may include at least one of the following random access parameters in RMSI or OSI information.

Information on the center frequency of the uplink band for performing the random access preamble: for example, information on $f_{NR-UL}$ corresponding to the NR UL band or $f_{UL}$ corresponding to the SUL band. If the corresponding information is included, the terminal may perform the random access on the corresponding UL band (this is called 1̂ implicit indication).

The 1-bit indication indicating whether the terminal performs the random access on the NR UL band or the SUL (this is called 2̂ explicit indication).

In case where the base station transmits to the terminal the random access parameters on the SUL through the RMSI or OSI, the random access parameter may include time/frequency resources for transmitting the random access preamble on the SUL. In general, although the initial random access preamble (Msg.1) is transmitted from the uplink, this is performed before the terminal acquires TA information, and thus the initial random access preamble is transmitted without TA (i.e., transmission is performed based on downlink timing of the terminal). However, since there is not downlink timing of the terminal for the NR DL band or the NR DL subframe on the SUL, the base station may transmit reference timing for the terminal to transmit Msg.1 to the SUL. Such reference timing may be an offset between a specific NR DL subframe (e.g., subframe on which a PBCH is transmitted) and an SUL slot (or subframe) on which Msg.1 is transmitted, or an offset between a specific NR system frame number (e.g., NR system frame number 0) acquired by the terminal through the NR DL band and the SUL slot (or subframe) on which Msg.1 is transmitted.

As another example, the base station may not transmit to the terminal separate information ($\hat{1}$ as described above) for the uplink band on which the random access should be performed or separate indication ($\hat{2}$ as described above). In this case, the terminal may transmit the random access preamble on the uplink band pre-engaged with the base station (this is called $\hat{3}$ pre-configuration). For example, if the base station and the terminal pre-engage to use the NR UL band as a default band for transmitting the random access preamble, the terminal may transmit the random access preamble through the NR UL band. Further, the base station and the terminal may pre-engage to use the SUL band as a default band for transmitting the random access preamble of the terminal. In this case, the base station may transmit only the random access parameter for the default band through the RMSI or OSI. Further, the terminal may transmit the random access preamble, uplink data, and control information/control signals on the default uplink band engaged with the base station until the terminal receives an additional command for band switching from the base station.

As still another example, the NR DL band or the NR UL band used by the base station and the terminal may be mapped to a specific SUL band. That is, if the terminal acquires the center frequency information of an NR cell downlink band accessed by the terminal itself through a synchronization signal and system information transmitted to the NR DL band, the terminal may automatically acquire frequency information of the SUL band (e.g., at least one of SUL band center frequency and bandwidth information). Further, if the terminal acquires frequency information of an NR cell uplink band accessed by the terminal itself (e.g., NR UL band center frequency and bandwidth information) through the synchronization signal and the system information transmitted on the NR DL band, the terminal may automatically acquire the frequency information of the SUL band (e.g., at least one of SUL band center frequency and bandwidth information). Further, the uplink frequency information of the NR cell and the frequency information on the SUL band may be mapped to the downlink frequency information of the NR cell acquired by the terminal. Accordingly, the terminal may perform the random access on the NR UL band or SUL by the method of $\hat{1}$, $\hat{2}$, or $\hat{3}$ as described above using the frequency information of the NR UL band acquired by the terminal itself or the frequency information of the SUL band.

In option 1 as described above, the terminal can perform the random access on only one of the NR UL band and the SUL band. Accordingly, the base station may expect that the random access preamble of the terminal is to be transmitted only on the band configured by the base station itself, and may monitor only the corresponding band. Further, since the base station transmits only the random access information on one of the two bands, overhead of the system information transmission can be reduced. However, if the number of terminals performing the random access on one band configured by the base station is increased, it is necessary to properly decentralize the terminals into other bands for load balancing. Accordingly, operations of the base station and the terminal to switch the bands capable of performing the random access may be necessary. The following options may be considered as band switching operations during the operation as option 1 as described above.

Option 1-A) In accordance with the option 1 as described above, the terminal may perform the random access on one of the NR UL band and the SUL band. The base station may transmit parameters for other bands excluding the band on which the random access has been performed through separate signaling after the random access procedure of the terminal. For example, if the random access is performed on the NR UL band, the parameters for the uplink transmission on the SUL may be transmitted to the terminal through separate signaling. Further, if the random access is performed on the SUL, the parameters for the uplink transmission on the NR UL band may be transmitted to the terminal through separate signaling.

Figure 3:
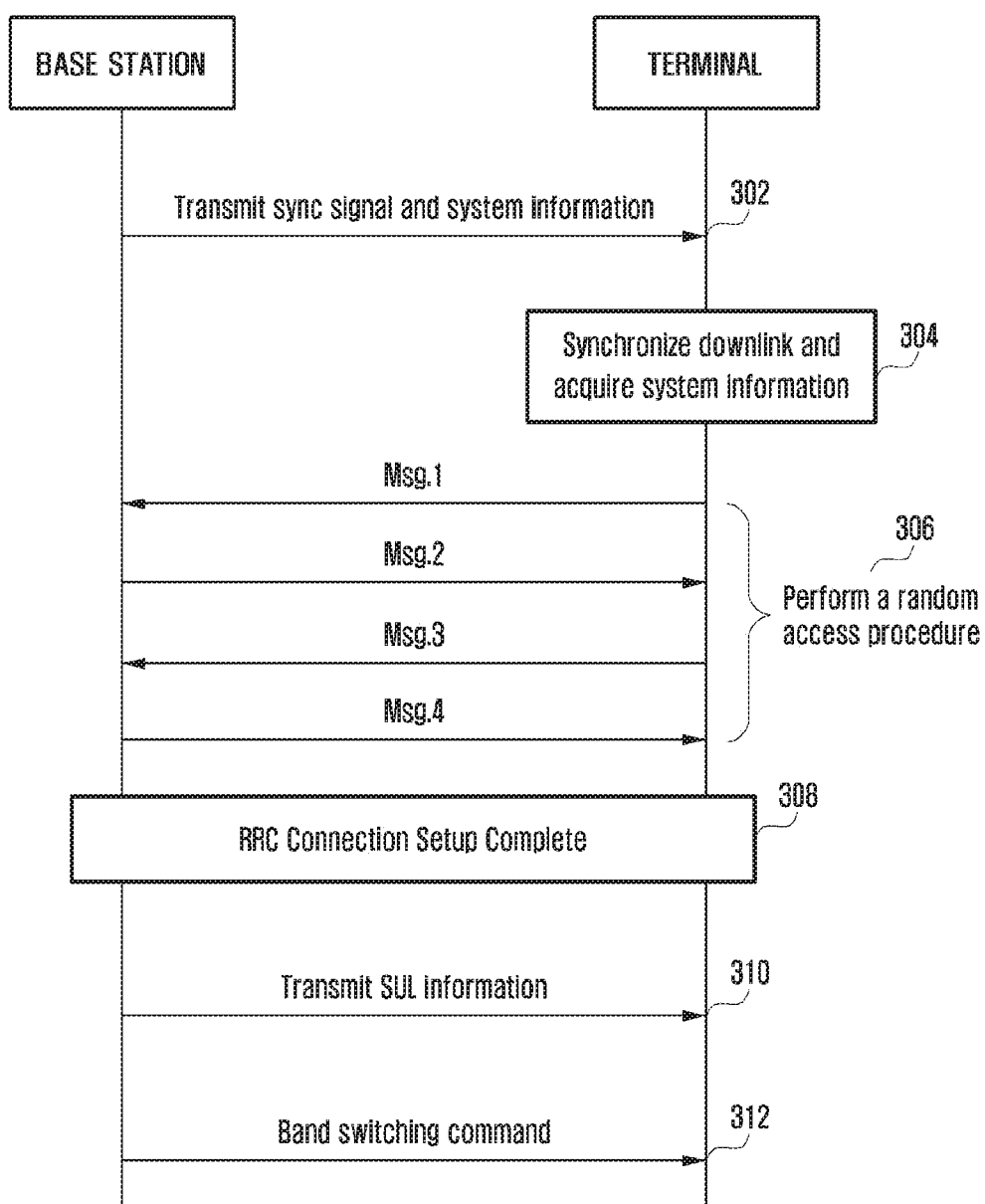
FIG. 3 is a diagram illustrating an example of a procedure by a base station and a terminal for performing a random access in SUL operation scenarios according to various embodiments of the disclosure.

As an example, consider FIG. 3. FIG. 3 is a diagram illustrating an example of a procedure by a base station and a terminal for performing a random access in SUL operation scenarios according to various embodiments of the disclosure. As shown in FIG. 3, the base station may transmit the previously exemplified random access parameters that can be transmitted on the NR UL band through the RMSI or OSI in operation 302. After performing the downlink synchronization on the NR DL band in operation 304, the terminal may receive information on the random access parameters through the RMSI or OSI, and may perform the random access procedure in operation 306. After completing the random access procedure and RRC connection setup in operation 308, the terminal may receive information on the SUL band from the base station through UE-specific RRC signaling in operation 310. In this case, the terminal may perform capability negotiation on whether the terminal itself supports the SUL band with the base station. The information on the SUL band transmitted by the base station through the UE-specific RRC signaling may include at least one of SUL band center frequency and bandwidth, timing advance (TA) information and subcarrier spacing information for transmitting uplink data and control information/control signal on the SUL, and information for the random access preamble (contention-free random access) on the SUL. In this case, the contention-free random access on the SUL band may be triggered by an order of the base station (e.g., through downlink control information (DCI) of a physical downlink control channel (PDCCH)), and may be used for the base station to acquire TA information of the terminal having performed the RRC connection (in a case where the TA timer expires and it is necessary to additionally acquire the TA information although the terminal is in an RRC connection state), or may be used for the base station to estimate an uplink path loss value on the SUL. On the other hand, in case of requesting switching of the uplink band, the base station may deactivate the band being used by the terminal, and may activate another band in operation 312. Further, the base station may make the band being used by the terminal be used as it is, and may additionally activate the other band. Such activation/deactivation may be transmitted from the base station to the terminal through MAC control element (CE), L1 signaling (e.g., DCI), or a combination thereof. For example, in FIG. 3, the base station may deactivate the NR UL band on which the terminal has performed the random access, and may activate the SUL band.

As another example, although not illustrated in FIG. 3, if the random access is performed on the SUL in accordance with option 1 as described above, the base station may transmit information on the NR UL band through the UE-specific RRC signaling. In this case, information on the NR UL band may include at least one of NR UL band center frequency and bandwidth, timing advance (TA) information for uplink data/control information/control signal transmission on the NR UL band, information on subcarrier spacing and beams, and information for indicating to the base station whether the random access preamble (contention-free random access preamble) has been transmitted on the NR UL band or whether the downlink beam has failed. In this case, the random access on the NR UL band may be triggered by the order of the base station (e.g., through the DCI of the physical downlink control channel (PDCCH)), and may be used for the base station to acquire the timing advance (TA) information that may differ from each other for beams used by the terminal. Further, the random access may be used for the base station to estimate the uplink path loss value of the NR UL band. Further, if the base station requests switching of the uplink band, the base station may deactivate the SUL band through MAC control element (CE), L1 signaling (e.g., DCI), or a combination thereof, and may activate the NR UL band. Further, the base station may make the SUL band on which the random access procedure has been performed be used as it is, and may additionally activate the NR UL band.

Option 1-B) By the method mentioned in option 1 as described above (e.g., $\hat{1}$ implicit indication, $\hat{2}$ explicit indication, and $\hat{3}$ pre-configuration), the base station may order the terminal to perform the random access on the NR UL band or on the SUL. Accordingly, the terminal may perform the random access on one of the NR UL band and the SUL band. In this case, unlike option 1-A as described above, the base station may command band switching through random access response (RAR) grant transmitted on the PDCCH or RAR (Msg.2) transmitted on the PDSCH as shown in FIGS. 4A and 4B.

Figure 4A:
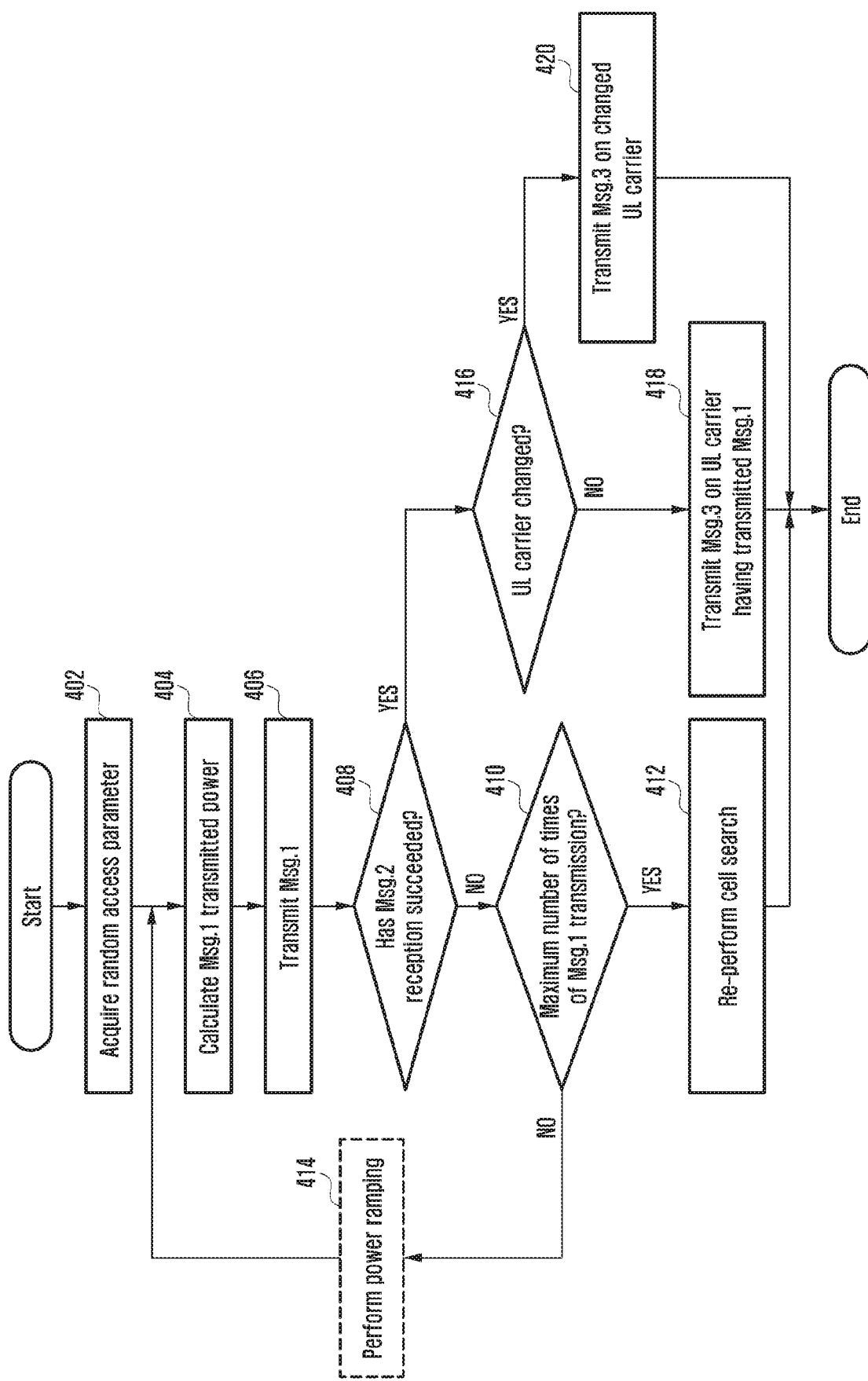
FIG. 4A is a diagram illustrating an example of a terminal operation for a terminal initial access in SUL operation scenarios according to various embodiments of the disclosure.
Figure 4B:
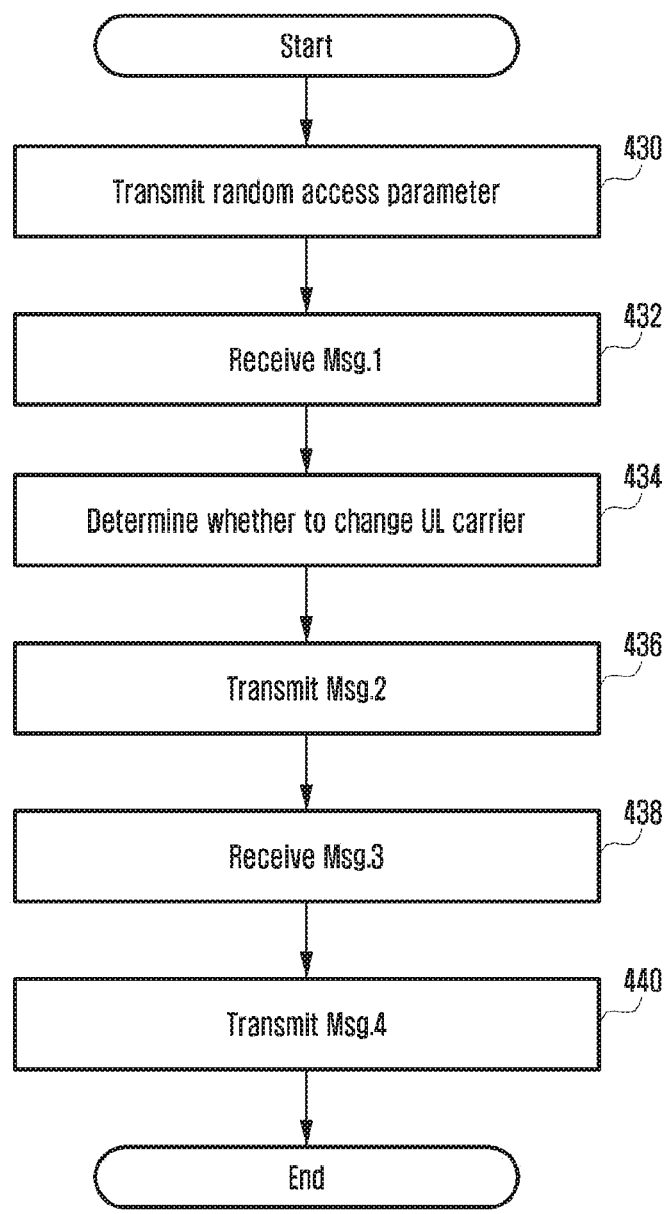
FIG. 4B is a diagram illustrating an example of a base station operation for a terminal initial access in SUL operation scenarios according to various embodiments of the disclosure.

As an example, see FIG. 4A. FIG. 4A is a diagram illustrating an example of a terminal operation for a terminal initial access in SUL operation scenarios according to various embodiments of the disclosure. As seen in FIG. 4A, if the base station configures to perform the random access on the NR UL band in accordance with option 1 as described above in operations 402 and 404, the terminal transmits the random access preamble (Msg.1) on the NR UL band in operation 406. The terminal having transmitted Msg.1 attempts reception of the RAR during RAR reception window (ra-ResponseWindowSize) configured by the base station through the RMSI or OSI (receive Msg.2) in operation 408. The terminal having not received Msg.2 in the corresponding window determines whether the number of transmissions of Msg.1 reaches the maximum value (or determines whether the number of retransmissions of Msg.1 reaches the maximum value) in operation 410. If the number of transmissions of Msg.1 has reached the maximum value, the terminal ends the random access operation, and re-performs cell search in operation 412. In this case, the maximum number of transmissions of Msg.1 may be included in random access parameter configuration of SIB or RMSI transmitted from the base station to the terminal (preambleTransMax). When the terminal retransmits Msg.1, the base station may increase transmitted power of Msg.1 as much as the power ramping step size (powerRampingStep) included in the ransom access parameter configuration of SIB or RMSI in operation 414. On the other hand, the terminal having succeeded in the Msg.2 reception may receive a band switching command included in the RAR grant or the RAR in operation 416. In this case, the base station may command the band switching in an explicit or implicit method as follows.

Explicit band switching command: The base station may set 1-bit field commanding the band switching in the RAR grant or RAR message to "1". The terminal having received this may transmit Msg.3 on another band other than the band used for Msg.1 transmission in operation 418. For example, if the terminal transmits Msg.1 on the NR UL band, and receives the band switching command through the RAR grant or RAR message, the terminal can transmit Msg.3 on the SUL. An opposite case may also be possible. On the other hand, if the base station commands the band switching through the RAR grant, the base station may transmit frequency information of the band to be changed by the terminal through the RAR (Msg.2) (e.g., center frequency and bandwidth of the band to be switched) and parameters for uplink transmission performed on the band to be changed in operation 420. In this case, the parameters for the uplink transmission may include TA used for the terminal to perform uplink transmission, parameters for calculating a transmitted power value of the terminal, and subcarrier spacing. As another example, the base station may not command the band switching through 1-bit field of the RAR grant, but may command the band switching through MAC CE transmitted to the RAR. In this case, the MAC CE may deactivate the uplink band used for Msg.1 transmission, and may activate the changed uplink band. That is, if Msg.1 is transmitted through the NR UL band, the base station may deactivate the NR UL band, and may activate the SUL band. The terminal having received this may transmit Msg.3 on the SUL band. An opposite case may also be possible. Even in case where the base station commands the band switching through the MAC CE of the RAR, as described above, the base station may transmit frequency information of the band to be changed by the terminal through the RAR (Msg.2) (e.g., center frequency and bandwidth of the band to be switched) and parameters for uplink transmission performed on the band to be changed.

Implicit band switching command: Unlike the above-described example (1-bit field of the RAR grant or RAR message or the MAC CE of the RAR explicitly commands the band switching), the band switching can be commanded if a specific field of the RAR grant or RAR message is set to a specific value. As an example, if the field indicating resource allocation information of the RAR is set to "00000 . . . 0" in the RAR grant, the terminal may determine that the base station has commanded the band switching. On the other hand, if the base station includes frequency information of a new band (e.g., center frequency and bandwidth of the band to be switched) and parameters for the uplink transmission performed in the band to be change in the RAR message, the terminal may determine that the band switching has been commanded. For example, when the terminal accessing Msg.1 on the NR UL band receives the RAR, information on the SUL band may be included in the RAR message. In this case, the terminal may transmit Msg.3 on the SUL.

In the above-described examples, in case of transmitting initial Msg.1 after acquiring the random access parameter transmitted from the base station, the terminal should set the transmitted power value for transmitting Msg. 1. In this case, the transmitted power value for transmitting Msg.1 may be determined by the terminal through mathematical expression 1 below.

$$P_{PRACH} = \min\{P_{CMAX}(i), \text{PREAMBLE\_RECEIVED\_TARGET\_POWER} + PL\}[dBm] \quad \text{Mathematical expression 1}$$

In the mathematical expression 1, $P_{CMAX}$ (i) means the maximum transmitted power value that the terminal can use in the i-th subframe (or slot). PREAMBLE_RECEIVED_TARGET_POWER is related to the transmitted power value for initial random access preamble transmission (preambleInitialReceivedTargetPower) configured by the base station through the RMSI or SIB and a power ramping step size. That is, it can be expressed as "PREAMBLE_RECEIVED_TARGET_POWER preambleInitialReceivedTargetPower+Delta_Preamble+(Preamble_transmission_counter−1)*powerRampingStep". The term "Delta_Preamble" is an offset value in accordance with the format of the random access preamble, and is a value pre-engaged between the base station and the terminal. As an example, preamble format 0 and format 1 may have an offset value of 0 dB, and preamble format 0 and format 1 may have an offset value of −3 dB.

On the other hand, in the mathematical expression 1, PL is a downlink path loss value estimated by the terminal through a downlink signal transmitted by the base station. As illustrated in FIGS. 2A and 2B, since the existence of the NR UL band corresponds to the existence of the NR DL band, it is possible to estimate the downlink path loss value for setting the transmitted power value of Msg.1 transmitted on the NR UL band using downlink signals transmitted to the NR DL band. However, since a downlink band corresponding to the SUL band does not exist, it is not possible to set the transmitted power value of Msg.1 using the downlink path loss value when the terminal transmits Msg.1 to the SUL. To solve this problem, the base station may transmit the transmitted power value that the terminal can use for transmission of Msg.1 or the path loss value that the terminal can use for transmission of Msg.1 through a master information block (MIB), RMSI, or OSI. As another example, even if the terminal transmits Msg.1 on the SUL band, the terminal can set the transmitted power value of Msg.1 using the downlink path loss value estimated from the downlink signal of the NR DL band. In this case, the uplink path loss value of the SUL may be different from the downlink path loss value of the NR DL band, and in order to compensate for this, the base station may transmit a specific offset value to the terminal through the MIB, RMSI, or OSI.

In the above-described examples, if the terminal changes the band from the NR UL band to the SUL band, the terminal may transmit Msg.3 through the physical uplink shared channel (PUSCH) on the SUL band. In this case, the terminal may set the transmitted power value for transmitting Msg.3 as in mathematical expression 2 below.

$$P_{PUSCH} = \min\{P_{CMAX}(i), P_{0\_PRE} + \Delta_{PREAMBLE\_Msg3} + \Delta_{TF} + PL + \Delta P_{rampup} + \delta_{msg2}\}[dBm] \quad \text{Mathematical expression 2}$$

In the mathematical expression 2, $P_{CMAX}$ (i) means the maximum transmitted power value that the terminal can use in the i-th subframe (or slot). $P_{0\_PRE}$ means preambleInitialReceivedTargetPower, and $\Delta_{PREAMBLE\_Msg3}$ is another offset value related to the random access preamble format, and may be configured by the base station through the RMSI or other system information (OSI). $\Delta_{TF}$ is a parameter related to the MCS of Msg.3, $\Delta P_{rampup}$ means a power ramping step size, and $\delta_{msg2}$ is a transmission power control (TPC) command transmitted from the RAR grant.

On the other hand, in the mathematical expression 2, PL is a downlink path loss value estimated by the terminal through a downlink signal transmitted by the base station. As illustrated in FIGS. 2A and 2B, since the existence of the NR UL band corresponds to the existence of the NR DL band, it is possible to estimate the downlink path loss value for setting the transmitted power value of Msg.1 transmitted on the NR UL band using downlink signals transmitted to the NR DL band. However, since a downlink band corresponding to the SUL band does not exist, it is not possible to set the transmitted power value of Msg.3 using the downlink path loss value when the terminal transmits Msg.3 to the SUL. To solve this problem, the base station may transmit the transmitted power value that the terminal can use for transmission of Msg.3 or the path loss value that the terminal can use for transmission of Msg.3 through the RAR. As another example, even if the terminal transmits Msg.3 on the SUL band, the terminal can set the transmitted power value of Msg.3 using the downlink path loss value estimated from the downlink signal of the NR DL band. In this case, the uplink path loss value of the SUL may be different from the path loss value of the NR DL band estimated by the terminal to transmit Msg.1, and in order to compensate for this, the base station may transmit a specific offset value through the RAR.

In the above-described examples, if the terminal changes the band from the NR UL band to the SUL band, the terminal may transmit Msg.3 through the physical uplink shared channel (PUSCH) on the SUL band. In this case, the terminal requires the TA value for transmitting Msg.3, and the base station can transmit the TA value to the terminal through the RAR. In this case, the base station may reflect the timing offset between the NR UL band and the SUL in the TA value.

The operation of the base station for option 1-B is illustrated in FIG. 4B. FIG. 4B is a diagram illustrating an example of a base station operation for a terminal initial access in SUL operation scenarios according to various embodiments of the disclosure. In FIG. 4B, the base station transmits the random access parameter for one of the NR UL band and the SUL band in operation 430. As an example, the base station may transmit the random access parameter for the NR UL band. The base station expects that Msg.1 of the terminal is to be transmitted to the NR UL band configured by the base station itself, and monitors the corresponding band in operation 432. Further, the base station may determine whether the UL band (UL carrier) for the corresponding terminal to transmit Msg.3 has been changed in operation 434. As an example, if the received power of Msg.1 transmitted by the terminal is equal to or smaller than the threshold value, the base station may determine that Msg.3 transmission of the corresponding terminal is to be performed on the SUL. As another example, even if the received power of Msg.1 transmitted from terminal-A is larger than the threshold value, the base station may determine to change the band for transmitting Msg.3 of terminal-A for load balancing with other terminals transmitting the random access preamble. The base station having determined to change the UL carrier (UL band) may transmit information on the changed band to the RAR grant and the RAR transmitted on the NR DL band in operation 436. In this case, information included in the RAR grant and RAR (Msg.2) is the same as that in the above-described terminal operation. The terminal having received Msg.2 on the NR DL band transmits Msg.3 in accordance with the band switching command included in the RAR grant and RAR (Msg.2). The base station may receive Msg.3 on the band commanded by the base station itself in operation 438, and may transmit Msg.4 on the NR DL band in operation 440.

Option 1-C) By the method mentioned in option 1 as described above (e.g., ①̂ implicit indication, ②̂ explicit indication, and ③̂ pre-configuration), the base station may order the terminal to perform the random access on the NR UL band or on the SUL. Accordingly, the terminal may perform the random access on one of the NR UL band and the SUL band. In this case, the terminal and the base station may operate through a combination of the option 1-A and option 1-B. More specifically, the terminal operating in option 1-B may receive a command for changing the UL band through UE-specific RRC signaling, MAC CE, or MAC message from the base station as in option 1-A after the RRC connection setup. In this case, the UL band used by the terminal in the random access process may be different from the UL band used for the random access or uplink data and control information/control signal transmission after the RRC connection setup.

Option 2) Transmission of a random access parameter for both the NR UL band and the SUL band.

In option 1 as described above, the base station transmits random access parameters of one of the NR UL band and the SUL. Unlike this, in option 2, the base station simultaneously transmits random access parameters for the NR UL band and random access parameters for the SUL band through RMSI or OSI. The terminal having received this may perform the following operations. The random access parameter that the base station transmits to the terminal through the RIVISI or OSI includes time/frequency resources for transmitting the random access preamble on the SUL. In general, although initial random access preamble (Msg.1) is transmitted from the uplink, Msg.1 transmission is performed before the terminal acquires TA information, and thus the terminal may transmit Msg.1 without TA (i.e., transmission is performed based on downlink timing of the terminal). However, since there is not downlink timing of the terminal for the NR DL band or the NR DL subframe on the SUL, the base station may transmit reference timing for the terminal to transmit Msg.1 to the SUL. Such reference timing may be an offset between a specific NR DL subframe (e.g., subframe on which a PBCH is transmitted) and an SUL slot (or subframe) on which Msg.1 is transmitted, or an offset between a specific NR system frame number (e.g., NR system frame number 0) acquired by the terminal through the NR DL band and the SUL slot (or subframe) on which Msg.1 is transmitted.

Figure 5A:
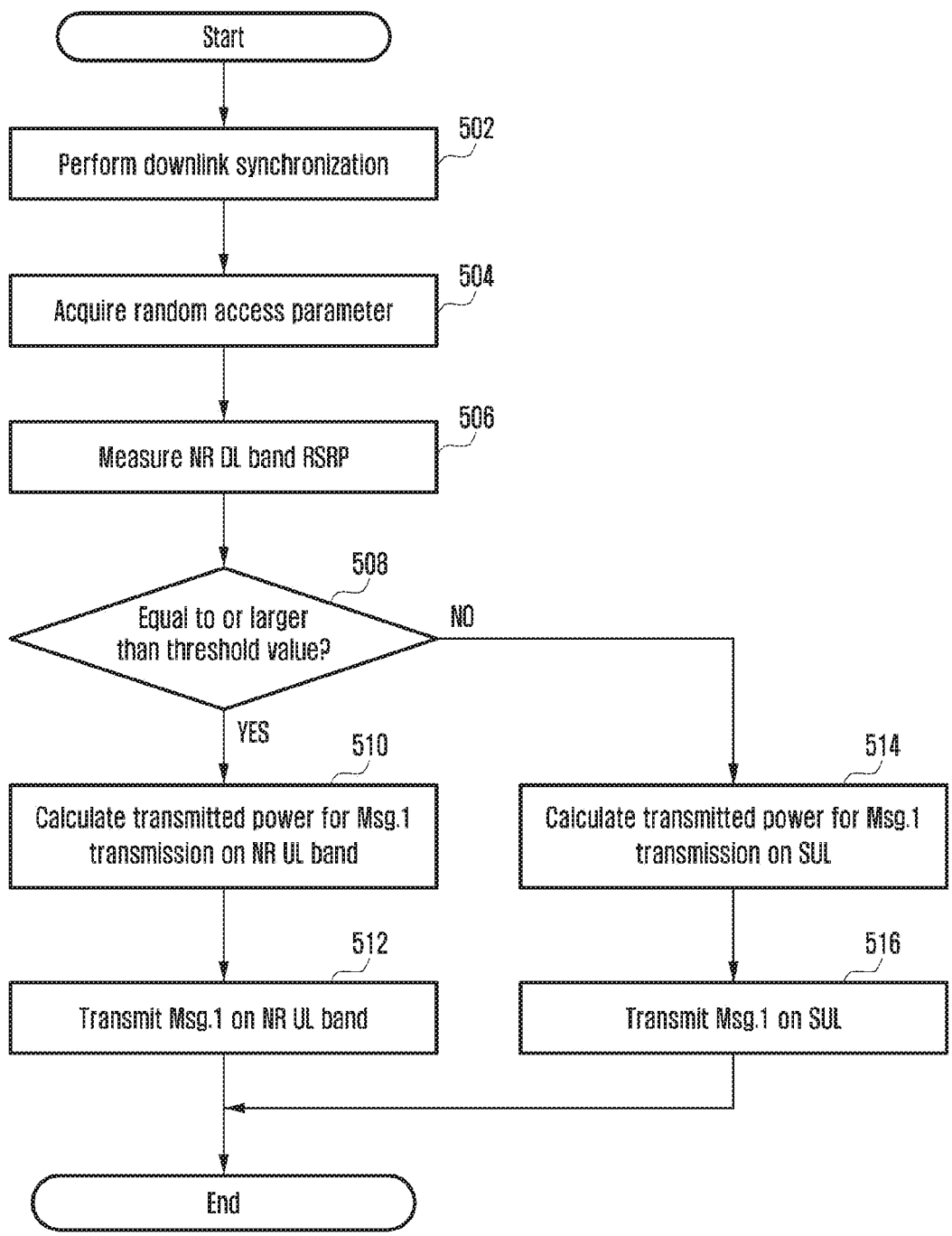
FIG. 5A is a diagram illustrating another example of a terminal operation for a terminal initial access in SUL operation scenarios according to various embodiments of the disclosure.

Option 2-A) FIG. 5A is a diagram illustrating another example of a terminal operation for a terminal initial access in SUL operation scenarios according to various embodiments of the disclosure. As seen in FIG. 5, the terminal performs downlink synchronization and acquires NR system information through reception of PSS/SSS and PBCH transmitted on the NR DL band in operation 502. Further, the terminal may acquire random access parameters through reception of RMSI or OSI transmitted on the NR DL band in operation 504. In this case, the random access parameters may include random access parameters for both the two bands so that the terminal can respectively perform the random access on the NR UL band and the SUL band. The terminal having acquired the random access parameters for the two bands may measure a reference signal received power (RSRP) of the NR DL band in operation 506. In this case, the RSRP may be a received signal strength of the SSS transmitted on the NR DL band, or an average value of the received signal strength of the SSS transmitted on the NR DL band and the received signal strength of a demodulation reference signal (DMRS) transmitted on the PBCH, or an average value of weighted sums. For example, "alpha" may be weighted on the received signal strength of the SSS, "beta" may be weighted on the received signal strength of the DMRS transmitted on the NR DL band, and the weighted received signal strengths are added together to obtain an average value thereof. In this case, the alpha and beta values may be configured by the base station through the RMSI or OSI, or may be pre-engaged between the base station and the terminal. The terminal having measured the RSRP of the NR DL band using one of the above-described methods may compare the threshold value configured by the base station with the RSRP value of the NR DL band measured by the terminal itself in operation 508. In this case, configuration of the threshold value may be performed through the RMSI or OSI. That is, if the RSRP value of the NR DL band measured by the terminal is equal to or larger than the threshold value configured by the base station, the terminal may transmit the random access preamble (Msg.1) on the NR UL band in operation 512. In this case, the terminal may calculate the transmitted power value of Msg.1 through the mathematical expression 1 in operation 510. On the other hand, if the RSRP value of the NR DL band measured by the terminal is smaller than the threshold value configured by the base station, the terminal may transmit Msg.1 on the SUL in operation 516. The transmitted power value of Msg.1 transmitted on the SUL may be calculated by the terminal through the mathematical expression 1 in operation 514. In this case, parameter values for calculating the transmitted power value of Msg.1 transmitted on the NR UL band and parameter values for calculating the transmitted power value of Msg.1 transmitted on the SUL in the mathematical expression 1 may be equal to or different from each other.

As an example, in the mathematical expression 1, PRE-AMBLE_RECEIVED_TARGET_POWER is a value set during the initial random access preamble transmission, and may be considered as a target received power when the base station receives the random access preamble. Since the NR UL band and the SUL use different frequency bands, they may have different channel characteristics. Accordingly, the value of PREAMBLE_RECEIVED_TARGET_POWER when Msg.1 is transmitted on the NR UL band and the value when Msg.1 is transmitted on the SUL may be different from each other.

As another example, in the mathematical expression 1, $P_{CMAX}$ (i) means the maximum transmitted power value that the terminal can use in the i-th subframe (or slot). The same maximum transmitted power value that can be used by the terminal may be used when Msg.1 is transmitted on the NR UL band and when Msg.1 is transmitted on the SUL.

As still another example, in the mathematical expression 1, PL is a downlink path loss value estimated by the terminal through the downlink signal that the base station transmits to the downlink. In case of transmitting Msg.1 on the NR UL band, the downlink path loss value estimated by the terminal on the NR DL band may be used in the mathematical expression 1. However, in case of the SUL band, there is not the downlink band corresponding to the SUL, and thus the terminal may reuse the downlink path loss value estimated on the NR DL band in the mathematical expression 1. In this case, an error occurring due to the different path loss values of the different channels may be compensated for using the offset value that the base station transmits to the terminal through the RIVISI or OSI.

Figure 5B:
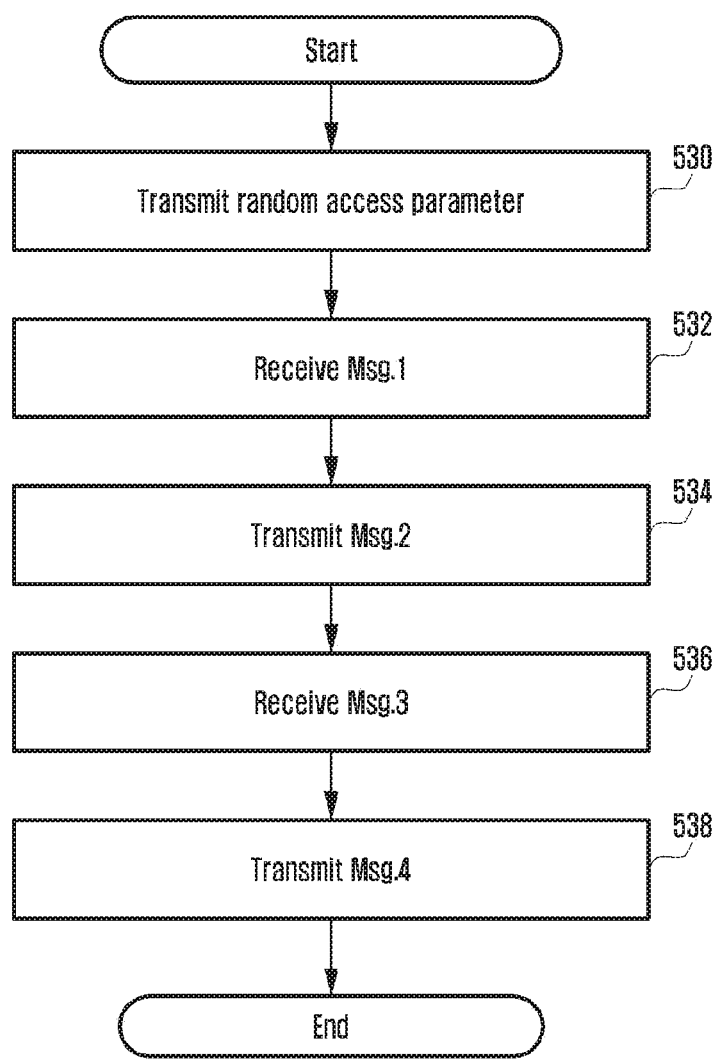
FIG. 5B is a diagram illustrating another example of a base station operation for a terminal initial access in SUL operation scenarios according to various embodiments of the disclosure.

The operation of the base station for option 2-A as described above is illustrated in FIG. 5B. FIG. 5B is a diagram illustrating another example of a base station operation for a terminal initial access in SUL operation scenarios according to various embodiments of the disclosure. In FIG. 5B, the base station transmits all the random access parameters on the NR UL band and the SUL band in operation 530. However, the base station does not know whether the terminal will transmit Msg.1 on the NR UL band or the SUL. This is because the terminal determines this in accordance with the quality of the NR DL band measured by the terminal itself as illustrated in FIG. 5A. Accordingly, the base station attempts reception of Msg.1 with respect to all the NR UL band and the SUL in operation 532. The base station having received Msg.1 transmits RAR grant and RAR (Msg.2) to the terminal through the NR DL band in operation 534. Although not exemplified in FIG. 5B, the base station, as shown in operation 434 of FIG. 4B, may determine whether the UL carrier is changed, and may command band switching through the RAR grant and the RAR (Msg.2). The terminal having received this may transmit Msg.3 on the band commanded by the base station as shown in FIG. 4A. The base station may receive Msg.3 on the band commanded by the base station itself in operation 536, and may transmit Msg.4 on the NR DL band in operation 538.

Figure 6A:
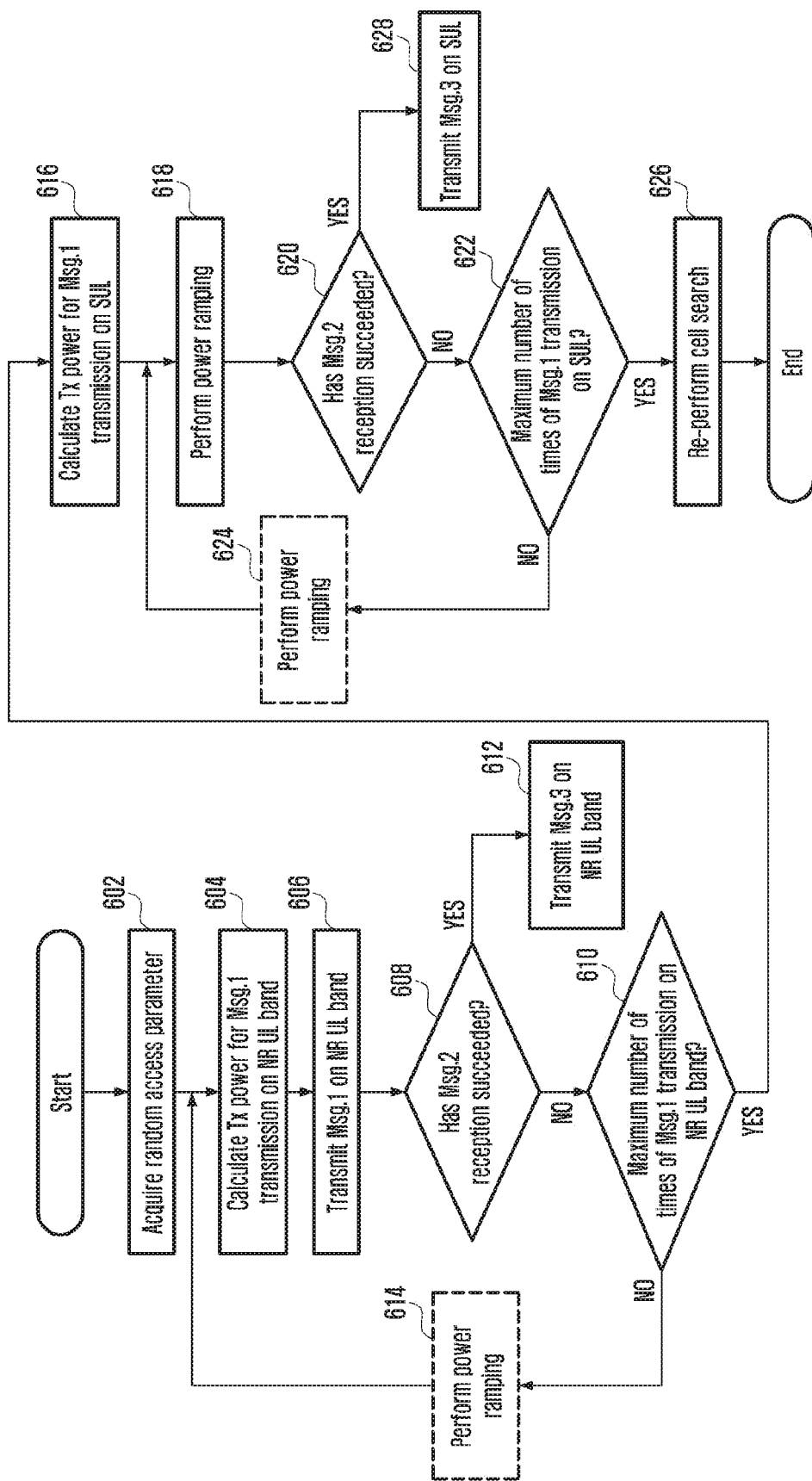
FIG. 6A is a diagram illustrating still another example of a terminal operation for a terminal initial access in SUL operation scenarios according to various embodiments of the disclosure.

Option 2-B) FIG. 6A is a diagram illustrating still another example of a terminal operation for a terminal initial access in SUL operation scenarios according to various embodiments of the disclosure. As illustrated in FIG. 6A, the SUL may be used as a fallback mode. More specifically, the terminal having received all the random access parameters in operation 602 for the NR UL band and the SUL from the base station, calculates the transmitted power of the random access preamble (Msg.1) in operation 604, and transmits Msg.1 on the NR UL band in operation 606. In this case, whether to transmit Msg.1 on the NR UL band may be determined by the terminal through the method of option 2-A as described above, and the terminal may transmit Msg.1 as a default on the NR UL band by pre-engagement between the base station and the terminal. The transmitted power of Msg.1 may be calculated using the mathematical expression 1, and in this case, the path loss value of the NR DL band may be used as the path loss value. However, since the center frequencies of the NR DL band and the NR UL band are far apart from each other, mismatch of the path loss values of the two bands may be great. Further, in an NR system using analog beamforming (e.g., hybrid beamforming), the beam used on the NR DL band and the beam used on the NR UL band may be different from each other. In this case, the mismatch of the path loss values of the two bands may be great. In this case, the base station may notify the terminal of the path loss value that can be used in the mathematical expression 1 through the RMSI or OSI. On the other hand, the terminal having transmitted Msg.1 attempts reception of the RAR during RAR reception window (ra-ResponseWindowSize) configured by the base station through the RMSI or OSI (receive Msg.2) in operation 608. The terminal having succeeded in the reception of Msg.2 may transmit Msg.3 on the NR UL band in operation 612.

The terminal having not received Msg.2 in the corresponding window determines whether the number of transmissions of Msg.1 reaches the maximum value (preambleTransMax) in operation 610. If the number of transmissions of Msg.1 on the NR UL band does not reach the maximum value, the terminal retransmits Msg.1 on the NR UL band. During the retransmission of Msg.1, the terminal may increase the transmitted power as much as the power ramping step size to transmit Msg.1 in operation 614. If the number of transmissions of Msg.1 on the NR UL band reaches the maximum value, the terminal may end the random access operation on the NR UL band, and may re-perform transmission of Msg.1 on the SUL. Since the channel characteristic on the NR UL band may be different from the channel characteristic of the SUL, the terminal may newly calculate the transmitted power of Msg. 1 on the SUL in operation 616. Power ramping may be performed in operation 618. In this case, the transmitted power value of Msg.1 may be calculated through the mathematical expression 1. In this case, parameter values for calculating the transmitted power value of Msg.1 transmitted on the NR UL band and parameter values for calculating the transmitted power value of Msg.1 transmitted on the SUL in the mathematical expression 1 may be equal to or different from each other.

As an example, in the mathematical expression 1, PREAMBLE_RECEIVED_TARGET_POWER is a value set during the initial random access preamble transmission, and may be considered as a target received power when the base station receives the random access preamble. Since the NR UL band and the SUL use different frequency bands, they may have different channel characteristics. Accordingly, the value of PREAMBLE_RECEIVED_TARGET_POWER when Msg.1 is transmitted on the NR UL band and the value when Msg.1 is transmitted on the SUL may be different from each other.

As another example, in the mathematical expression 1, $P_{CMAX}$ (i) means the maximum transmitted power value that the terminal can use in the i-th subframe (or slot). The same maximum transmitted power value that can be used by the terminal may be used when Msg.1 is transmitted on the NR UL band and when Msg.1 is transmitted on the SUL.

As still another example, in the mathematical expression 1, PL is a downlink path loss value estimated by the terminal through the downlink signal that the base station transmits to the downlink. In case of transmitting Msg.1 on the NR UL band, the downlink path loss value estimated by the terminal on the NR DL band may be used in the mathematical expression 1. However, in case of the SUL band, there is not the downlink band corresponding to the SUL, and thus the terminal may reuse the downlink path loss value estimated on the NR DL band in the mathematical expression 1. In this case, an error occurring due to the different path loss values of the different channels may be compensated for using the offset value that the base station transmits to the terminal through the RMSI or OSI.

The terminal having transmitted Msg.1 on the SUL attempts reception of the RAR during RAR reception window (ra-ResponseWindowSize) configured by the base station through the RMSI or OSI (receive Msg.2) in operation 620. The terminal having not received Msg.2 in the corresponding window determines whether the number of transmissions of Msg.1 reaches the maximum value (preambleTransMax) in operation 622. If the number of transmissions of Msg.1 on the SUL does not reach the maximum value, the terminal retransmits Msg.1 on the SUL. in operation 624, during the retransmission of Msg.1, the terminal may increase the transmitted power as much as the power ramping step size to transmit Msg.1. The powerRampingStep for power ramping on the NR UL band and powerRampingStep for power ramping on the SUL may be different from each other. Further, the maximum number of transmissions (preambleTransMax) of Msg.1 on the NR UL band and the maximum number of transmissions (preambleTransMax) of Msg.1 on the SUL may be different from each other. If the number of transmissions of Msg.1 on the SUL reaches the maximum value, the terminal may end the random access operation on the SUL, and may re-perform cell search in operation 626. The terminal having succeeded in the reception of Msg.2 on the SUL may transmit Msg.3 on the SUL in operation 628.

Figure 6B:
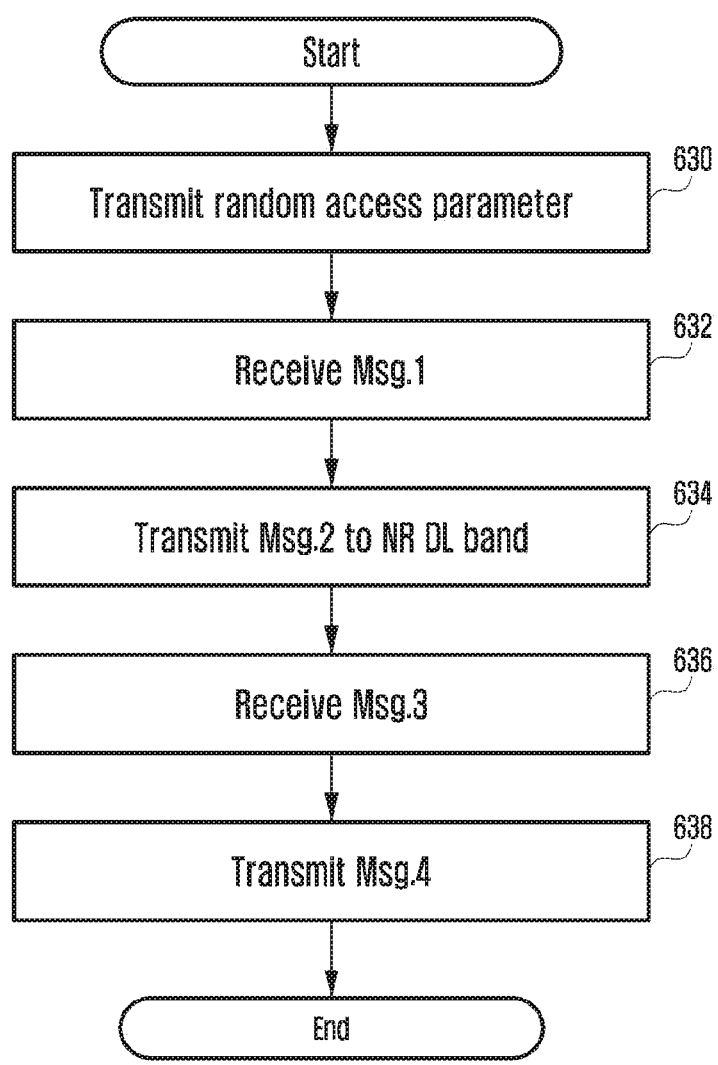
FIG. 6B is a diagram illustrating still another example of a base station operation for a terminal initial access in SUL operation scenarios according to various embodiments of the disclosure.

The operation of the base station for option 2-B as described above is illustrated in FIG. 6B. FIG. 6B is a diagram illustrating still another example of a base station operation for a terminal initial access in SUL operation scenarios according to various embodiments of the disclosure. In FIG. 6B, the base station transmits all the random access parameters on the NR UL band and the SUL band in operation 630. However, the base station does not know whether the terminal will transmit Msg.1 on the NR UL band or the SUL. This is because the terminal attempts transmission of Msg.1 on the SUL as shown in operation 628 of FIG. 6A if transmission of Msg.1 on the NR UL band has failed. Accordingly, the base station attempts reception of Msg.1 with respect to all the NR UL band and the SUL in operation 632. The base station having received Msg.1 transmits RAR grant and RAR (Msg.2) to the terminal through the NR DL band in operation 634. Although not exemplified in FIG. 6B, the base station, as shown in FIG. 4B, may determine whether the UL carrier is changed, and may command band switching through the RAR grant and the RAR (Msg.2). The terminal having received this may transmit Msg.3 on the band commanded by the base station as shown in FIG. 4A. The base station may receive Msg.3 on the band commanded by the base station itself in operation 636, and may transmit Msg.4 on the NR DL band in operation 638.

Figure 7A:
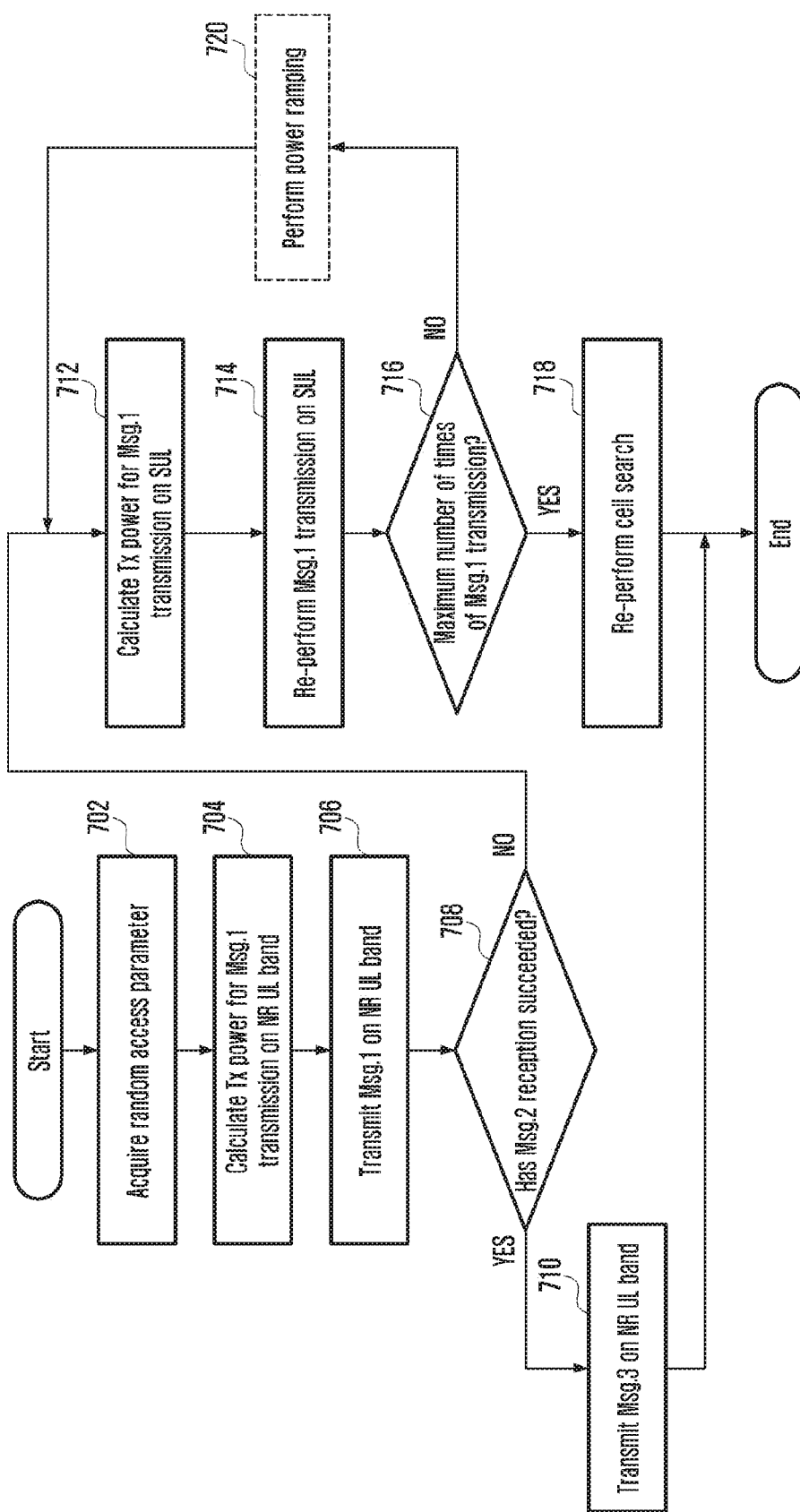
FIG. 7A is a diagram illustrating yet still another example of a terminal operation for a terminal initial access in SUL operation scenarios according to various embodiments of the disclosure.

Option 2-C) As a modification of option 2-B as described above, the operations of the base station and the terminal as illustrated in FIG. 7A may be considered. FIG. 7A is a diagram illustrating yet still another example of a terminal operation for a terminal initial access in SUL operation scenarios according to various embodiments of the disclosure. More specifically, the terminal having acquired all the random access parameters for the NR UL band in operation 702, calculates the transmitted power of the random access preamble (Msg.1) in operation 704, and the SUL band through the NR DL band may transmit Msg.1 on the NR UL band in operation 706. In this case, whether to transmit Msg.1 on the NR UL band may be determined by the terminal through the method of option 2-A as described above, and the terminal may transmit Msg.1 as a default on the NR UL band by pre-engagement between the base station and the terminal. The transmitted power of Msg.1 may be calculated using the mathematical expression 1, and in this case, the path loss value of the NR DL band may be used as the path loss value. However, since the center frequencies of the NR DL band and the NR UL band are far apart from each other, mismatch of the path loss values of the two bands may be great. Further, in an NR system using analog beamforming (e.g., hybrid beamforming), the beam used on the NR DL band and the beam used on the NR UL band may be different from each other. In this case, the mismatch of the path loss values of the two bands may be great. In this case, the base station may notify the terminal of the path loss value that can be used in the mathematical expression 1 through the RMSI or OSI. On the other hand, the terminal having succeeded in the reception of Msg.2 within the RAR reception window size (ra-ResponseWindowSize) configured by the base station in operation 708 may transmit Msg.3 on the NR UL band in operation 710. The terminal having failed in the reception of Msg.2 within the RAR window size on the NR DL band in operation 708 may re-perform the transmission of Msg.1 on the SUL based on the random access parameters for the SUL configured by the base station through the RSMI or OSI in operation 714. Since the channel characteristics of the NR UL band and the SUL may be different from each other, the terminal may re-calculate the transmitted power value for transmitting Msg.1 on the SUL in operation 712. In this case, the transmitted power value of Msg.1 may be calculated through the path loss value measured by the terminal on the NR DL band and preambleInitialReceivedTargetPower on the SUL configured by the base station through the RMSI or OSI. If the number of transmissions of Msg.1 on the SUL exceeds the maximum number of transmissions configured by the base station in operation 716, the terminal may end the random access process, and may re-perform cell search in operation 718. If the number of transmissions of Msg.1 on the SUL does not exceed the maximum number of transmissions configured by the base station, the terminal may perform retransmission of Msg.1 on the SUL. In this case, the terminal may perform retransmission of Msg.1 by increasing the transmitted power value of previous Msg.1 transmission as much as the power ramping step size (powerRampingStep) in operation 720.

Figure 7B:
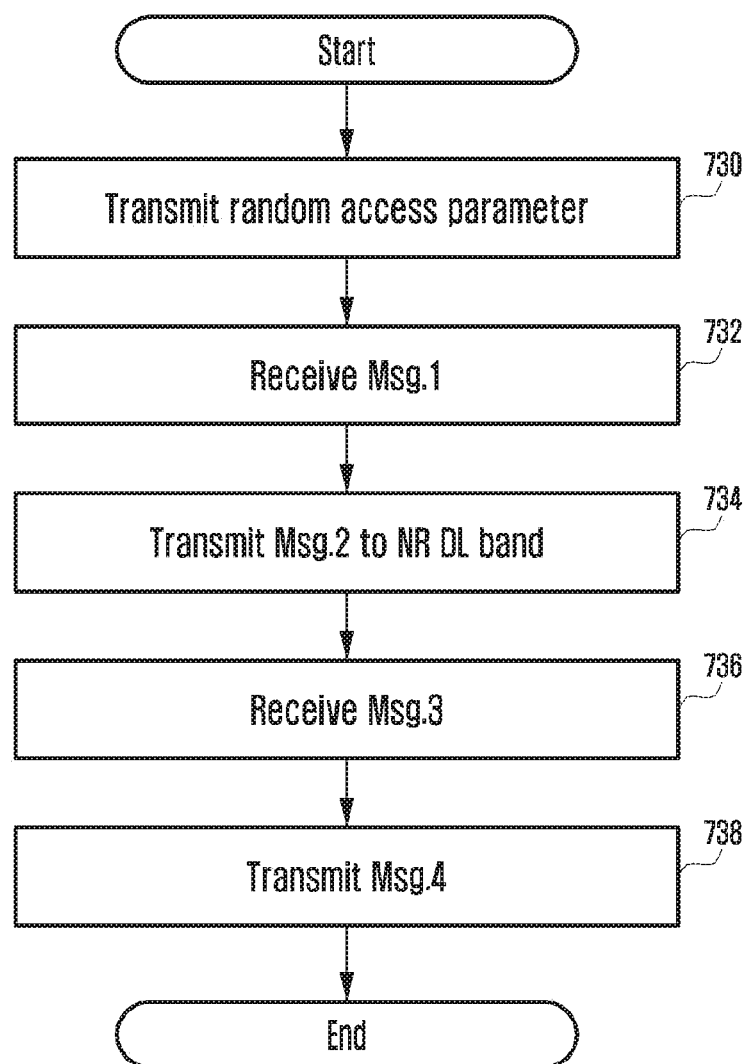
FIG. 7B is a diagram illustrating yet still another example of a base station operation for a terminal initial access in SUL operation scenarios according to various embodiments of the disclosure.

The operation of the base station for option 2-C as described above is illustrated in FIG. 7B. FIG. 7B is a diagram illustrating yet still another example of a base station operation for a terminal initial access in SUL operation scenarios according to various embodiments of the disclosure. In FIG. 7B, the base station transmits all the random access parameters on the NR UL band and the SUL band in operation 730. However, the base station does not know whether the terminal will transmit Msg.1 on the NR UL band or the SUL. This is because the terminal attempts transmission of Msg.1 on the SUL as shown in FIG. 7A if transmission of Msg.1 on the NR UL band has failed. Accordingly, the base station attempts reception of Msg.1 with respect to all the NR UL band and the SUL in operation 732. The base station having received Msg.1 transmits RAR grant and RAR (Msg.2) to the terminal through the NR DL band in operation 734. Although not exemplified in FIG. 7B, the base station, as shown in FIG. 4B, may determine whether the UL carrier is changed, and may command band switching through the RAR grant and the RAR (Msg.2). The terminal having received this may transmit Msg.3 on the band commanded by the base station as shown in FIG. 4A. The base station may receive Msg.3 on the band commanded by the base station itself in operation 736, and may transmit Msg.4 on the NR DL band in operation 738.

The terminals having succeeded in the initial access transmit a data channel (physical uplink shared channel (PUSCH), a control channel (physical uplink control channel (PUCCH)), and a sounding signal (sounding reference signal (SRS)) to the uplink. In this case, whether to transmit the PUSCH, PUCCH, and SRS on the NR UL band or on the SUL should be investigated as the operations of the terminal and the base station. For example, the base station may configure whether the PUSCH, PUCCH, and SRS should be transmitted on the NR UL band or on the SUL through UE-specific RRC, MAC CE, or MAC message to the terminals having succeeded in the initial access (i.e., terminals in an RRC connection state). As another example, the base station may command activation and deactivation of the NR UL band or the SUL through the MAC CE as shown in FIGS. 8A to 8C with respect to the terminals having succeeded in the initial access (i.e., terminals in the RRC connection state).

Figure 8A:
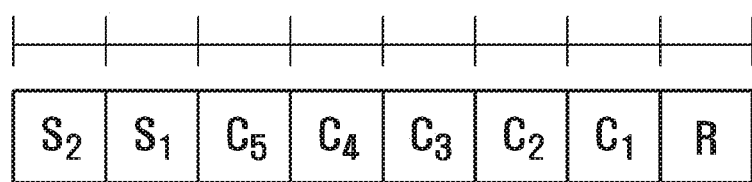
FIG. 8A is a diagram illustrating an example of a media access control-control element (MAC CE) for activation/deactivation of a SUL in SUL operation scenarios according to various embodiments of the disclosure.
Figure 8B:
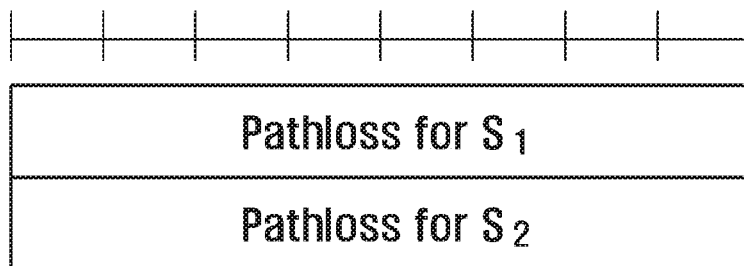
FIG. 8B is a diagram illustrating an example of a MAC CE for transmission of a path loss value measured by a base station in a SUL in SUL operation scenarios according to various embodiments of the disclosure.
Figure 8C:
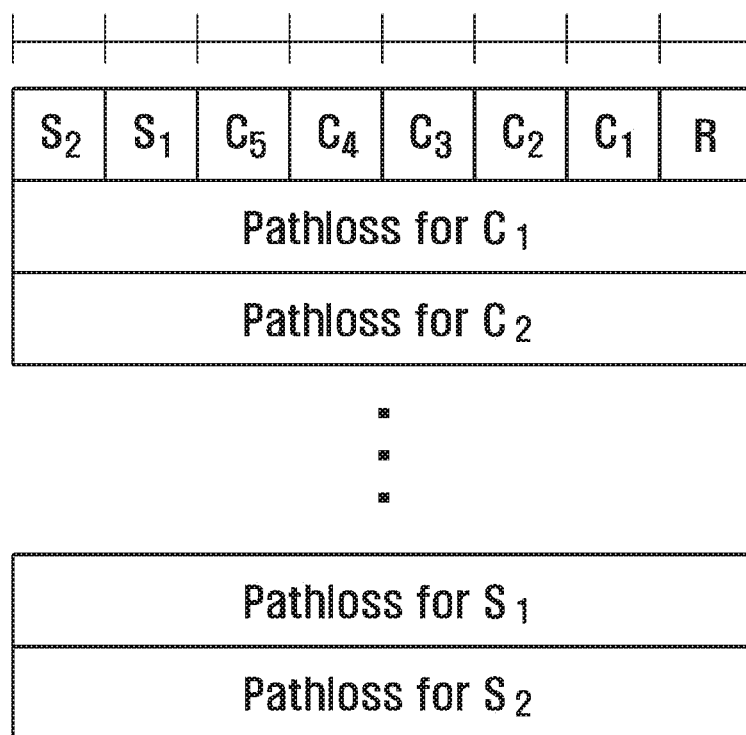
FIG. 8C is a diagram illustrating an example of a MAC CE for activation/deactivation of a SUL and for transmission of a path loss value measured by a base station in an activated SUL in SUL operation scenarios according to various embodiments of the disclosure.

FIG. 8A is a diagram illustrating an example of a media access control-control element (MAC CE) for activation/deactivation of a SUL in SUL operation scenarios according to various embodiments of the disclosure. FIG. 8B is a diagram illustrating an example of a MAC CE for transmission of a path loss value measured by a base station in a SUL in SUL operation scenarios according to various embodiments of the disclosure. FIG. 8C is a diagram illustrating an example of a MAC CE for activation/deactivation of a SUL and for transmission of a path loss value measured by a base station in an activated SUL in SUL operation scenarios according to various embodiments of the disclosure.

In this case, as shown in FIG. 8A, the MAC CE may command only activation and deactivation of the NR UL band or the SUL. In FIG. 8A, C1 to C5 correspond to 1-bit field (i.e., 5-bit in total), and mean 5 CCs used on the NR UL band. Further, S1 and S2 correspond to 1-bit field (i.e., 2-bit in total), and means two CCs used on the SUL. The term "R" means a reversed 1-bit field. For example, if C1 to C5 are composed of "10001", the NR UL band means that CC #1 and CC #5 are activated, and CC #2, CC #3, and CC #4 are deactivated. In a similar manner, if S1 and S2 are composed of "10", SUL means that CC #1 is activated, and CC #2 is deactivated. Although FIG. 8A illustrates an example in which the NR UL band is composed of 5 CCs, and the SUL is composed of 2 CCs, but are not limited thereto.

On the other hand, the terminal may control the transmitted power of the PUSCH, PUCCH, and SRS transmitted to the uplink. In general, the uplink transmitted power is controlled using transmitted power control parameters configured by the base station and a downlink path loss measured by the terminal. However, since there is not the downlink band corresponding to the SUL, the terminal is unable to estimate the path loss value during transmission of uplink PUSCH, PUCCH, and SRS on the SUL. Accordingly, as shown in FIG. 8B, the base station may transmit the path loss value measured by the base station itself on the SUL through the MAC CE. Although FIG. 8B illustrates an example in which the SUL is composed of 2 CCs, and the base station transmit the path loss value for S1 and S2 to the terminal, it may be extended to an example in which the SUL is composed of 1 CC, or the SUL is composed of three or more CCs. As another example, as shown in FIG. 8C, the base station may command activation and deactivation of the CCs constituting the NR UL band or the SUL, and may transmit UL path loss values of respective CCs (path loss values measured by the base station) to the terminal at the same time. Although FIG. 8C illustrates that the base station transmits to the terminal only UL path loss values for all the CCs constituting the NR UL band and the SUL, the base station may not transmit the path loss values for the CCs constituting the NR UL band, but may transmit only the UL path loss values for the CCs constituting the SUL.

Figure 9:
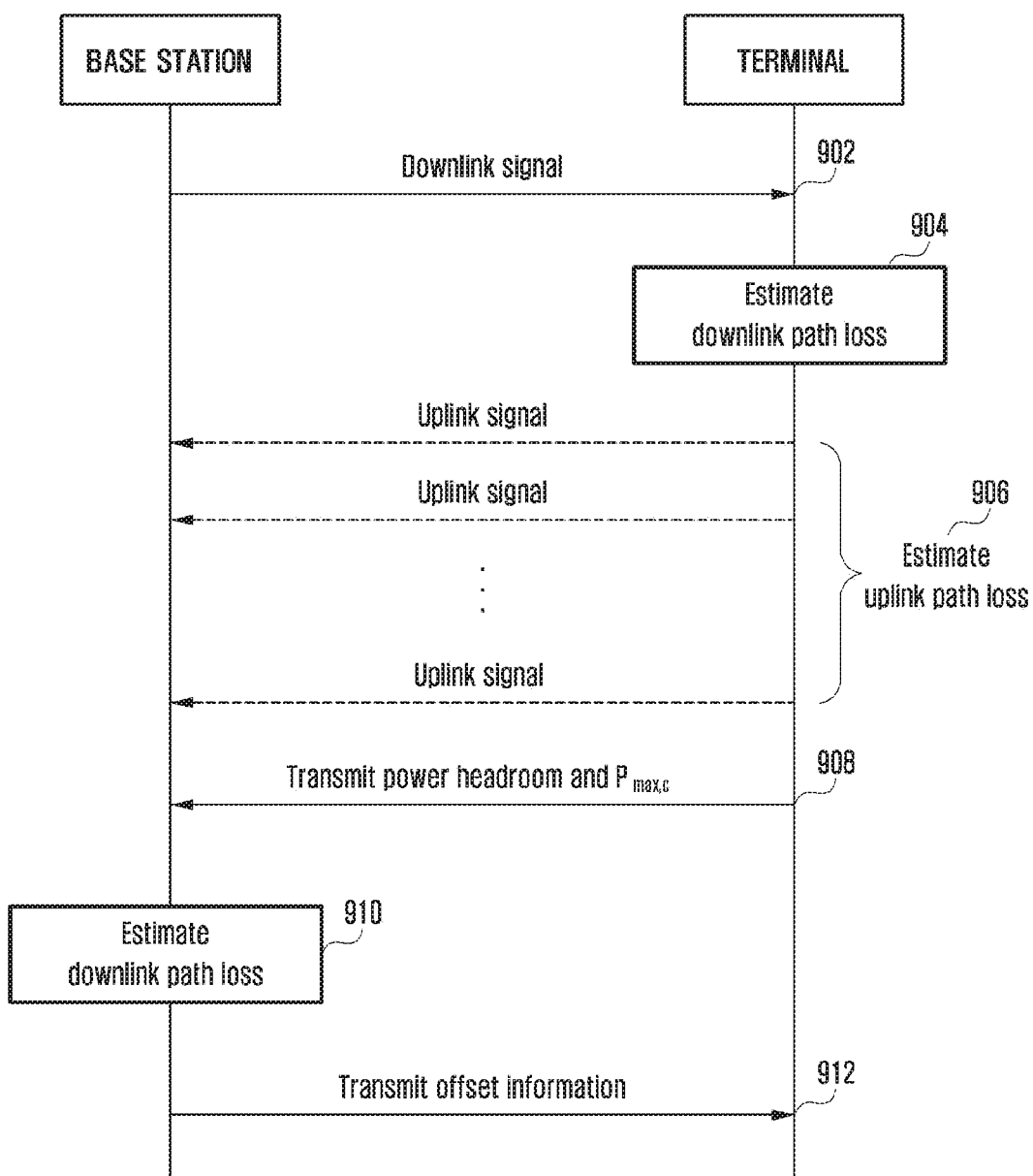
FIG. 9 is a diagram illustrating an example of a procedure in which a base station transmits to a terminal offset information between a downlink path loss value measured by the terminal and an uplink path loss value measured by the base station according to various embodiments of the disclosure.

Although FIGS. 8B and 8C illustrate that the base station transmits the UL path loss value measured by the base station itself, the base station may transmit an offset value rather than the UL path loss value measured by the base station itself. For example, consider FIG. 9. FIG. 9 is a diagram illustrating an example of a procedure in which a base station transmits to a terminal offset information between a downlink path loss value measured by the terminal and an uplink path loss value measured by the base station according to various embodiments of the disclosure. As illustrated in FIG. 9, the base station may transmit a downlink signal to the terminal in operation 902, and the terminal may estimate the downlink path loss value using this in operation 904. In this case, the downlink signal may be a downlink synchronization signal (SSS or DMRS of SSS and PBCH), or downlink channel state information—reference signal (CSI-RS). Whether the terminal should estimate the path loss using the synchronization signal or the CSI-RS may be configured by the base station using the DCI, MAC CE, or RRC signaling. The terminal having estimated the downlink path loss may set the transmitted power for transmitting the PUSCH, PUCCH, and SRS transmitted by the terminal itself to the uplink using this.

On the other hand, the base station may estimate the uplink path loss using the uplink signal transmitted from the terminal in operation 906. In this case, the uplink signal may be an SRS, random access preamble, or DMRS used to transmit uplink PUSCH/PUCCH. FIGS. 8A to 8C illustrate that a time point of operation 906 at which the uplink path loss of the base station is estimated is after a time point of operation 904 at which the downlink path loss of the terminal is estimated, but is not limited thereto. For example, the time point of operation 906 at which the uplink path loss of the base station is estimated may be before the time point of operation 904 at which the downlink path loss of the terminal is estimated or after a time point of operation 910 at which the downlink path loss of the base station is estimated.

The terminal may transmit to the base station a power headroom value that means a difference between the transmitted power value used by the terminal itself for the uplink transmission and the maximum transmitted power value Pmax,c of the terminal itself in operation 908. Further, in addition to the power headroom value, the terminal may transmit to the base station the maximum transmitted power value of the terminal itself in operation 908. The base station may reversely estimate the downlink path loss value estimated by the terminal using the power headroom value transmitted from the terminal and Pmax,c value. Accordingly, the base station may estimate the uplink path loss value through the uplink SRS transmitted by the terminal and the random access preamble, and may calculate an offset between the downlink path loss value estimated by the terminal and a predicted value of the downlink path loss value. Such an offset value may be transmitted from the base station to the terminal through the MAC CE of FIGS. 8B and 8C in operation 912.

In the embodiments of the disclosure as described above, constituent elements included in the disclosure are expressed in a singular form or in a plural form. However, such a singular or plural expression is selected to suit a situation presented for convenience in explanation, and thus the disclosure is not limited to such singular or plural constituent elements. Even plural constituent elements may be expressed in a singular form, and even a single constituent element may be expressed in a plural form.

Figure 10:
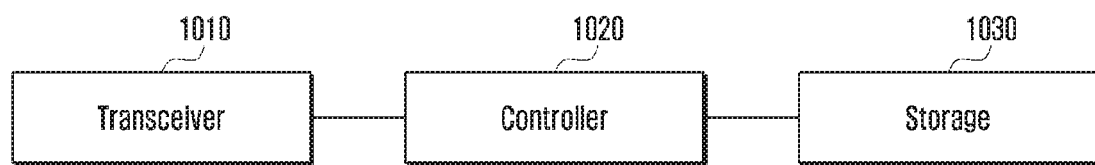
FIG. 10 is a block diagram illustrating a structure of a terminal according to various embodiments of the disclosure.

FIG. 10 is a block diagram illustrating a structure of a terminal according to various embodiments of the disclosure.

As shown in FIG. 10, the terminal (also referred to as user equipment (UE) or mobile station (MS)) may include a transceiver 1010, a controller 1020, and a storage 1030. In this disclosure, the controller may be defined as a circuit, an application-specific integrated circuit, or at least one processor.

The controller 1020 may control the transceiver 1010 to receive information for performing a random access from a base station, determine a frequency band to perform the random access between first and second frequency bands based on the information for performing the random access, and control the transceiver 1010 to transmit a random access preamble on the determined frequency band.

The controller 1020 may measure a reference signal received power (RSRP) received from the base station, compare the RSRP with a threshold value included in the information for performing the random access, determine the first frequency band as the frequency band for performing the random access if the RSRP is smaller than the threshold value, and determine the second frequency band as the frequency band for performing the random access if the RSRP is equal to or larger than the threshold value.

The controller 1020 may identify a target received power parameter of the random access preamble corresponding to the first frequency band from the information for performing the random access if the RSRP is smaller than the threshold value, and control the transceiver 1010 to transmit the random access preamble on the first frequency band based on the target received power parameter of the random access preamble corresponding to the first frequency band.

The controller 1020 may identify a target received power parameter of the random access preamble corresponding to the second frequency band from the information for performing the random access if the RSRP is equal to or larger than the threshold value, and control the transceiver 1010 to transmit the random access preamble on the second frequency band based on the target received power parameter of the random access preamble corresponding to the second frequency band.

The controller 1020 may control the transceiver 1010 to receive information on transmission of a physical uplink control channel (PUCCH) from the base station on terminal-specific radio resource control (RRC) signaling, and control the transceiver 1010 to transmit the PUCCH on the first or second frequency band based on the information on the transmission of the PUCCH.

The storage 1030 may store at least one of information transmitted or received through the transceiver 1010 and information generated through the controller 1020.

Figure 11:
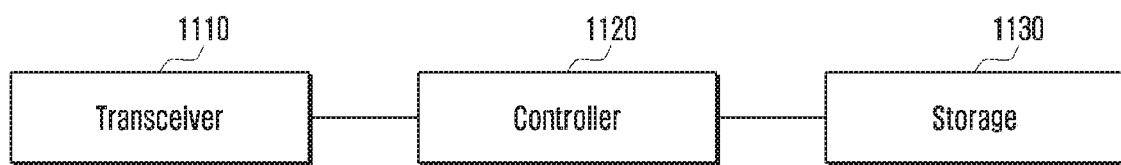
FIG. 11 is a block diagram illustrating a structure of a base station according to various embodiments of the disclosure.

FIG. 11 is a block diagram illustrating a structure of a base station according to various embodiments of the disclosure.

As shown in FIG. 11, the base station (also referred to as evolved Node B (eNB), next generation Node B (gNB) or BS) may include a transceiver 1110, a controller 1120, and a storage 1130. In this disclosure, the controller may be defined as a circuit, an application-specific integrated circuit, or at least one processor.

The controller 1120 may generate information for performing the random access in a first or second frequency band, control the transceiver 1110 to transmit the generated information to a terminal, and control the transceiver 1110 to receive a random access preamble for performing the random access on the frequency band determined based on the generated information.

The controller 1120 may control the transceiver 1110 to transmit to the terminal information on a frequency band related to transmission of a physical uplink control channel (PUCCH) on terminal-specific radio resource control (RRC) signaling.

The storage 1130 may store at least one of information transmitted or received through the transceiver 1110 and information generated through the controller 1120.

While the disclosure has been described with reference to various embodiments thereof, it will be understood t by those skilled in the art that various changes in form and details may be made therein without departing from the spirit and scope of the disclosure as defined by the appended claims and their equivalents.

What is claimed is:

1. A method by a terminal for performing a random access in a wireless communication system, the method comprising:
   receiving, from a base station, first information for configuring a supplementary uplink (SUL) and second information for configuring an uplink (UL);
   detecting a physical downlink control channel (PDCCH) order based on downlink control information (DCI) including an indicator for indicating one of an UL carrier or an SUL carrier as a carrier;
   determining the carrier for a physical random access channel (PRACH) transmission based on the indicator included in the DCI; and
   transmitting, to the base station, the PRACH transmission on the determined carrier.

2. The method of claim 1, further comprising:
   identifying that a random access procedure corresponding to the PRACH transmission is initiated based on the PDCCH order.

3. The method of claim 1, wherein the DCI further includes information on a contention-free random access.

4. The method of claim 3, wherein the indicator included in the DCI indicates which the carrier to transmit the PRACH transmission based on the information on the contention-free random access and the first information for configuring the SUL.

5. The method of claim 1, wherein a frequency of the SUL carrier is lower than a frequency of the UL carrier.

6. A method by a base station for performing a random access in a wireless communication system, the method comprising:
   transmitting, to a terminal, first information for configuring a supplementary uplink (SUL) and second information for configuring an uplink (UL);
   transmitting, to the terminal, downlink control information (DCI) including an indicator for indicating one of an UL carrier or an SUL carrier as a carrier; and
   receiving, from the terminal, a physical random access channel (PRACH) transmission on the carrier, in case that a physical downlink control channel (PDCCH) order is detected based on the DCI and the carrier for the PRACH transmission is determined based on the indicator included in the DCI.

7. The method of claim 6, wherein a random access procedure corresponding to the PRACH transmission is initiated based on the PDCCH order.

8. The method of claim 6, wherein the DCI further includes information on a contention-free random access.

9. The method of claim 8, wherein the indicator included in the DCI indicates which the carrier to transmit the PRACH transmission based on the information on the contention-free random access and the first information for configuring the SUL.

10. The method of claim 6, wherein a frequency of the SUL carrier is lower than a frequency of the UL carrier.

11. A terminal for performing a random access in a wireless communication system, the terminal comprising:
   a transceiver; and
   a controller configured to:
      control the transceiver to receive, from a base station, first information for configuring a supplementary uplink (SUL), (SUL) and second information for configuring an uplink (UL),
      detect a physical downlink control channel (PDCCH) order based on downlink control information (DCI) including an indicator for indicating one of an UL carrier or an SUL carrier as a carrier,
      determine the carrier for a physical random access channel (PRACH) transmission based on the indicator included in the DCI, and
      control the transceiver to transmit, to the base station, the PRACH transmission on the determined carrier.

12. The terminal of claim 11, wherein the controller is configured to:
   identify that a random access procedure corresponding to the PRACH transmission is initiated based on the PDCCH order.

13. The terminal of claim 11, wherein the DCI further includes information on a contention-free random access.

14. The terminal of claim 13, wherein the indicator included in the DCI indicates which the carrier to transmit the PRACH transmission based on the information on the contention-free random access and the first information for configuring the SUL.

15. The terminal of claim 11, wherein a frequency of the SUL carrier is lower than a frequency of the UL carrier.

16. A base station for performing a random access in a wireless communication system, the base station comprising:
   a transceiver; and
   a controller configured to:
      control the transceiver to transmit, to a terminal via the transceiver, first information for configuring a supplementary uplink (SUL) and second information for configuring an uplink (UL),
      control the transceiver to transmit, to the terminal via the transceiver, downlink control information (DCI) including an indicator for indicating one of an UL carrier or an SUL carrier as a carrier, and
      control the transceiver to receive, from the terminal via the transceiver, a physical random access channel (PRACH) transmission on the carrier, in case that a physical downlink control channel (PDCCH) order is detected based on the DCI and the carrier for the PRACH transmission is determined based on the indicator included in the DCI.

17. The base station of claim 16, wherein a random access procedure corresponding to the PRACH transmission is initiated based on the PDCCH order.

18. The base station of claim 16, wherein the DCI further includes information on a contention-free random access.

19. The base station of claim 18, wherein the indicator included in the DCI indicates which the carrier to transmit the PRACH transmission based on the information on the contention-free random access and the first information for configuring the SUL.

20. The base station of claim 16, wherein a frequency of the SUL carrier is lower than a frequency of the UL carrier.

\* \* \* \* \*